(12) United States Patent
Yamakawa

(10) Patent No.: US 9,599,789 B2
(45) Date of Patent: Mar. 21, 2017

(54) IMAGING LENS AND IMAGING APPARATUS

(71) Applicant: FUJIFILM Corporation, Tokyo (JP)

(72) Inventor: Hiromitsu Yamakawa, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/642,908

(22) Filed: Mar. 10, 2015

(65) Prior Publication Data

US 2015/0260956 A1 Sep. 17, 2015

(30) Foreign Application Priority Data

Mar. 12, 2014 (JP) .................. 2014/048377

(51) Int. Cl.
*G02B 9/60* (2006.01)
*G02B 13/06* (2006.01)
*G02B 13/00* (2006.01)
*G02B 13/04* (2006.01)
*G02B 9/34* (2006.01)

(52) U.S. Cl.
CPC .............. *G02B 9/60* (2013.01); *G02B 13/06* (2013.01); *G02B 9/34* (2013.01); *G02B 13/004* (2013.01); *G02B 13/04* (2013.01)

(58) Field of Classification Search
CPC ... G02B 9/04; G02B 9/06; G02B 9/08; G02B 9/10; G02B 9/12; G02B 9/14; G02B 13/04; G02B 13/06; G02B 9/60
USPC ........ 359/781, 783, 784, 785–790, 792–794, 359/754–779, 753, 714–715
See application file for complete search history.

(56) References Cited

U.S. PATENT DOCUMENTS

| 5,933,286 A * | 8/1999 | Yamada .................. G02B 9/60 359/753 |
| 7,633,688 B2 * | 12/2009 | Kamo ................ G02B 13/0095 359/761 |
| 2007/0206295 A1 | 9/2007 | Yamashita et al. |
| 2009/0002849 A1 * | 1/2009 | Kim ....................... G02B 13/06 359/749 |
| 2010/0188757 A1 | 7/2010 | Saitoh |

FOREIGN PATENT DOCUMENTS

| CN | 102289052 | 12/2011 |
| JP | 2006-284620 | 10/2006 |

(Continued)

OTHER PUBLICATIONS

A look at Lens Materials, Jenean Carlton, Aug. 1, 2012, http://www.eyecarebusiness.com/articleviewer.aspx?articleID=107335.*

(Continued)

*Primary Examiner* — Pascal M Bui-Pho
*Assistant Examiner* — Alberto Betancourt
(74) *Attorney, Agent, or Firm* — Young & Thompson

(57) ABSTRACT

The imaging lens consists essentially of a front group that consists essentially of a negative first lens having a meniscus shape with a convex surface toward the object side, a negative second lens and a positive third lens; a stop; a positive rear group that consists essentially of one positive lens and one negative lens. When the Abbe number with respect to the d-line of the material of the first lens is νd1 and the refractive index thereof is Nd1, conditional formula (1) below is satisfied:

$$60.0 < \nu d1 + 26 * Nd1 < 85.0 \qquad (1).$$

13 Claims, 11 Drawing Sheets

EXAMPLE 1

(56) References Cited

FOREIGN PATENT DOCUMENTS

JP         2007-233152     9/2007
JP         2009-063877     3/2009

OTHER PUBLICATIONS

German Search Report dated Nov. 4, 2015 in German Patent Application No. 10 2015 103 153.1 with English translation of German Search Report.

\* cited by examiner

EXAMPLE 4

IMAGING LENS AND IMAGING APPARATUS

CROSS-REFERENCE TO RELATED APPLICATIONS

The present application claims priority under 35 U.S.C. §119 to Japanese Patent Application No. 2014-048377, filed on Mar. 12, 2014. The above application(s) is hereby expressly incorporated by reference, in its entirety, into the present application.

BACKGROUND OF THE INVENTION

Field of the Invention

The present invention relates to an imaging lens and an imaging apparatus, and more particularly to an imaging lens suitable for use in a vehicle mounted camera, a surveillance camera, and the like that utilize an image sensor, such as CCD's (Charge Coupled Device), CMOS's (Complementary Metal Oxide Semiconductor), and the like as well as to an imaging apparatus equipped with this imaging lens.

Description of the Related Art

In recent years, image sensors such as CCD's, CMOS's, and the like have achieved significant miniaturization and increased numbers of pixels. Therefore, there is demand for bodies of imaging devices and imaging lenses mounted thereon to be miniaturized and reduced in weight as well. Meanwhile, there is demand for the imaging lenses for use in a vehicle mounted camera, a surveillance camera, and the like to have high weather resistance, wide angles of view which enable a satisfactory visual field over a wide range to be secured, and high optical performance.

Examples of the imaging lenses in the aforementioned field include the imaging lenses disclosed in Patent Documents 1 through 4 (Japanese Unexamined Patent Publication No. 2006-284620, Japanese Unexamined Patent Publication No. 2007-233152, Japanese Unexamined Patent Publication No. 2009-063877, and Chinese Patent Publication No. 102289052). Patent Documents 1 through 4 disclose the imaging lenses of a five-lens configuration in which aspherical lenses are included.

SUMMARY OF THE INVENTION

In recent years, demand for a wider angle of view has been increasing in the fields of vehicle mounted cameras, surveillance cameras, and the like. For example, a full angle of view which exceeds 180 degree is desired. Further, accompanying miniaturization and increased numbers of pixels of recent image sensors, there is demand for imaging lenses to have high resolution and have high optical performance such that favorable images can be obtained up to a wide range of an imaging region. However, it was difficult for conventional lens systems to achieve a wider angle of view and high optical performance at the same time to a degree that meets the recent demand while being configured at low cost and in small sizes.

For example, it is necessary for the first lens to have a great negative power and for lateral chromatic aberration generated thereby to be reduced as much as possible so as to achieve a wider angle of view and high resolution. A material, the refractive index of which is relatively large and the Abbe number of which is relatively great, is used for the first lens. Further, to achieve high resolution, longitudinal chromatic aberration is improved by increasing the number of lenses on the image side of the stop. However, many materials having high Abbe numbers are expensive because they contain a large amount of costly substances, such as rare earth materials. Therefore, it was difficult to increase the number of lenses while achieving cost reduction.

The present invention has been developed in view of the foregoing circumstances. It is the object of the present invention is to provide an imaging lens that is capable of achieving a wider angle of view and high optical performance while involving low cost. It is also the object of the present invention is to provide an imaging apparatus equipped with this imaging lens.

An imaging lens of the present invention consists essentially of:

a front group which consists essentially of a negative first lens having a meniscus shape with a convex surface toward the object side, a negative second lens, of which a point along the optical axis at the image-side surface is more toward the object side than points on both ends of the effective diameter of the image-side surface, and a positive third lens;

an aperture stop; and a rear group which is positive as a whole in this order from the object side, wherein the rear group consists essentially of one positive lens and one negative lens; and conditional formula (1) below is satisfied:

$$60.0 < vd1 + 26*Nd1 < 85.0 \quad (1),$$ where vd1: the Abbe number with respect to the d-line of the material of the first lens, and Nd1: the refractive index with respect to the d-line of the material of the first lens.

The imaging lens of the present invention may include lenses substantially without power; optical elements other than lenses such as stops, cover glasses, and the like; lens flanges; lens barrels; image sensors; and mechanical components such as image stabilization mechanisms, in addition to the front group and the rear group.

Further, in the present invention, surface shapes of lenses, such as a convex surface, a concave surface, a planar surface, biconcave, meniscus, biconvex, plano-convex, plano-concave, and the like; and signs of the refractive powers of lenses, such as positive and negative, should be considered in a paraxial region if aspheric surfaces are included therein, unless otherwise noted. Moreover, in the present invention, the sign of the radius of curvature is positive in the case that a surface shape is convex on the object side, and negative in the case that the surface shape is convex on the image side.

Note that in the imaging lens of the present invention, it is preferable for the third lens to be of a shape with a convex surface toward the object side.

Further, in the imaging lens according to the present invention, it is preferable for the rear group to consist essentially of the negative lens and the positive lens in this order from the object side. Note that the positive lens and the negative lens may be arranged in this order from the object side.

Further, in the imaging lens according to the present invention, it is preferable for the positive lens and the negative lens in the rear group to be cemented to each other.

In this case, it is preferable for a joint surface of the positive lens and the negative lens to be of a shape with a convex surface toward the object side in a paraxial region.

Furthermore, in this case, it is preferable for the joint surface of the positive lens and the negative lens to be of an aspherical shape in which a refractive power becomes weaker in portions further away from the optical axis.

In the imaging lens according to the present invention, it is preferable for a specific gravity of the material of the first lens to be less than or equal to 4.0.

It is preferable for the imaging lens of the present invention to satisfy conditional formulas (2) through (8). Note that the imaging lens of the present invention may preferably have a configuration, in which any one of conditional formulas (2) through (8) below is satisfied or may have a configuration in which an arbitrary combination of two or more of the conditional formulas are satisfied.

$$0.15 < f3/L < 0.26 \quad (2)$$

$$d4/L < 0.07 \quad (3)$$

$$vd2 > 50 \quad (4)$$

$$vd3 < 35 \quad (5)$$

$$vda > 50 \quad (6)$$

$$vdb < 35 \quad (7)$$

$$80.0 < vd1 + 35 * Nd1 < 96.0 \quad (8)$$

$$vd3 < 27 \quad (5\text{-}1), \text{ where}$$

f3: the focal length of the third lens,
L: the distance from the object-side surface of the first lens to the imaging plane along the optical axis (the back focus corresponds to an air converted length),
d4: the distance between the second lens and the third lens along the optical axis,
vd2: the Abbe number with respect to the d-line of the material of the second lens,
vd3: the Abbe number with respect to the d-line of the material of the third lens,
vda: the Abbe number with respect to the d-line of the material of the positive lens of the rear group, and
vdb: the Abbe number with respect to the d-line of the material of the negative lens of the rear group.

The imaging apparatus of the present invention is equipped with the aforementioned imaging lens of the present invention.

According to the first imaging lens of the present invention, a shape and power of each lens are suitably set in a lens system constituted by the minimum number of lenses, i.e., five lenses, and conditional formula (1) is satisfied. This realizes an imaging lens having a sufficient wide angle of view and high optical performance while being configured at low cost.

According to the imaging apparatus of the present invention, the imaging apparatus is equipped with the imaging. This enables the imaging apparatus to be configured at low cost, to perform photography at a wide angle of view, and to obtain high-quality images.

DESCRIPTION OF THE PREFERRED EMBODIMENTS

Hereinafter, embodiments of the present invention will be described in detail with reference to the accompanying drawings. FIGS. 1 through 5 are cross-sectional views illustrating examples of configuration of the imaging lenses according to the embodiments of the present invention, which respectively correspond to the imaging lenses of Examples 1 through 5 to be described later. The basic configurations illustrated in FIGS. 1 through 5 are all the same, and the manners in which the configurations are illustrated are also the same. Therefore, the imaging lenses according to the embodiments of the present invention will be described mainly with reference to FIG. 1.

The imaging lens according to the embodiment of the present invention is a lens system of a five-lens configuration in which a front group G1 that consists essentially of a first lens L1, a second lens L2, and a third lens L3; and a rear group G2 that consists essentially of a fourth lens L4 and a fifth lens L5 are arranged in this order from the object side along the optical axis Z. An aperture stop St is disposed between the third lens L3 and the fourth lens L4. The size of the imaging lens can be reduced in the radial direction by disposing the aperture stop St between the third lens L3 and the fourth lens L4.

Figure 1:
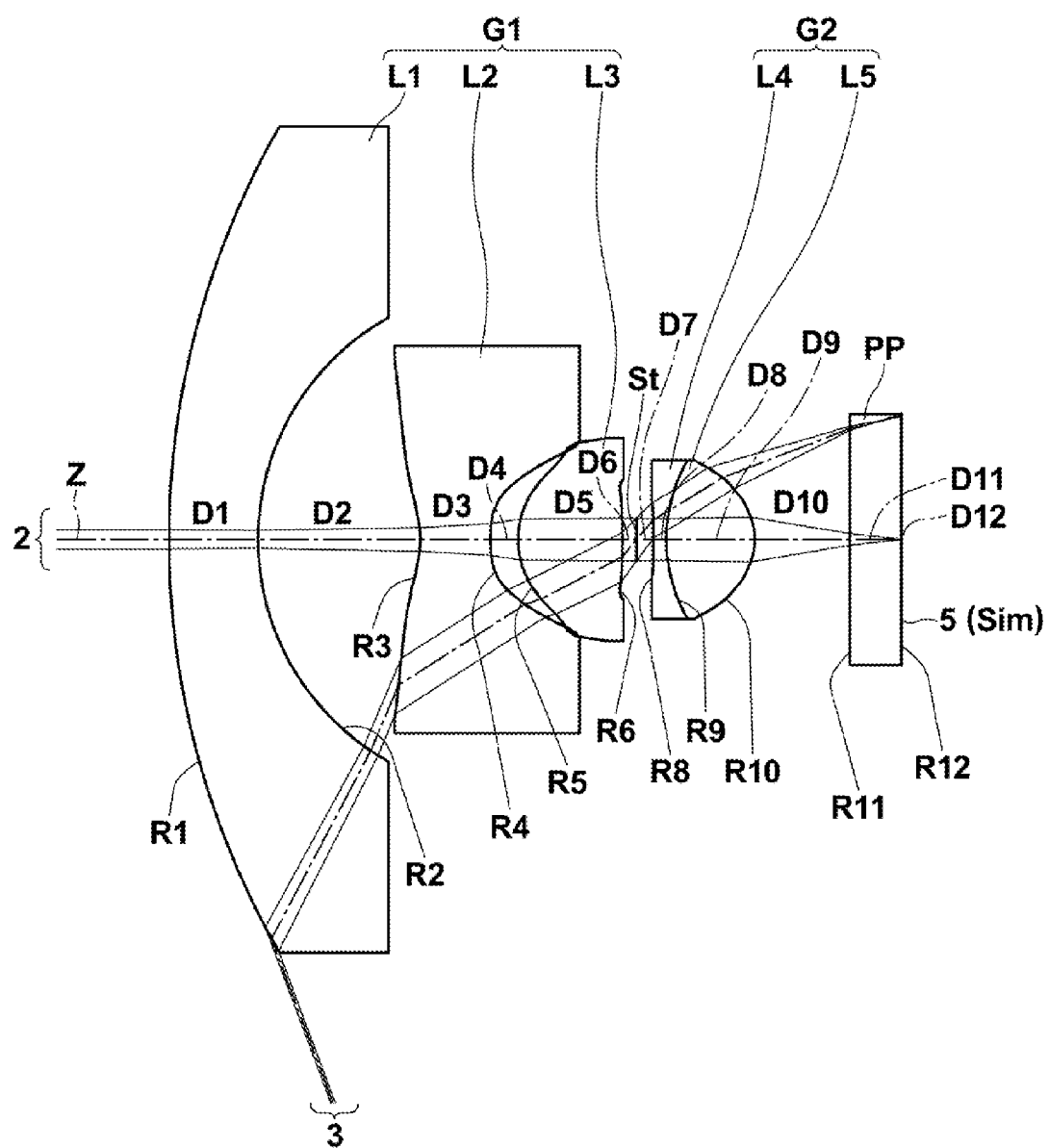
FIG. 1 is a cross-sectional view illustrating a lens configuration and optical paths of an imaging lens of Example 1 of the present invention.

Note that in FIG. 1, the left side is the object side and the right side is the image side. The aperture stop St shown in FIG. 1 does not necessarily represent the size or shape thereof, but represents the position thereof on the optical axis. Symbol Ri (i=1, 2, 3, . . . ) in FIG. 1 shows the radius of curvature of each lens surface, and symbol Di (i=1, 2, 3, . . . ) shows the distance between surfaces. FIG. 1 also illustrates axial rays 2 from an object point at an infinite distance and off-axis rays 3 having the maximum angle of view.

FIG. 1 shows an image sensor 5 disposed on the imaging plane Sim of the imaging lens, taking the case of applying the imaging lens to an imaging apparatus into consideration. Further, when the imaging lens is applied to the imaging apparatus, it is preferable for a cover glass, a low-pass filter, an infrared cut filter, or the like to be provided according to the configurations of a camera on which the lens is mounted. FIG. 1 illustrates an example in which a plane parallel optical member PP that presumes such components is provided between the fifth lens L5 and the image sensor 5 (the imaging plane Sim).

The first lens L1 is configured to be a meniscus lens having a negative power with a convex surface toward the object side. Configuring the first lens L1 to have a negative power and to be a meniscus lens with a convex surface toward the object side in such a manner is advantageous from the viewpoint of widening the angle of view such that the angle of view exceeds 180 degree and of correcting distortion. The first lens L1 is assumed to be exposed to wind, rain, and cleansing solvents because the first lens L1 is disposed on the most-object side. However, there is an advantage that dirt, dust, moisture, and the like of concern under such conditions are not likely to remain on the object-side surface of the first lens L1 because the surface is convex.

Further, the second lens L2 and the third lens L3 are configured to have a negative power and a positive power, respectively. The fours lens L4 and the fifth lens L5 of the rear group G2 are configured to have a negative power and a positive power, respectively. The rear group G2 has a positive power as a whole. Note that the fourth lens L4 and the fifth lens L5 may have a positive power and a negative power, respectively.

The second lens L2 is configured to have a shape in which a point along the optical axis at the image-side surface is more toward the object side than points on both ends of the effective diameter of the image-side surface. The expression "a point along the optical axis at the image-side surface is more toward the object side than points on both ends of the effective diameter of the image-side surface" means that a point along the optical axis should be more toward the object side than points on both ends of the effective diameter of the image-side surface although the image-side surface of the second lens L2 may be of a shape with a convex surface toward the object side or may be of a shape with a concave surface toward the object side in the paraxial region. Configuring the image-side surface of the second lens L2 to have such a shape enables the angles at which the peripheral rays enter optical elements disposed after the third lens L3 to be appropriately reduced, resulting in balancing of aberration between the center and the periphery being facilitated.

Configuring the third lens L3 to have a positive power facilitates correction of distortion and lateral chromatic aberration.

Further, configuring the rear group G2 having a positive power to be disposed on the back of the stop St enables the third lens L3 and the rear group G2 to share a positive refractive power, thereby suppressing the occurrence of spherical aberration while maintaining a power arrangement of a retro-focus type. Further, configuring the fourth lens L4 and the fifth lens L5 of the rear group G2 to be respectively a positive lens and a negative lens enables longitudinal chromatic aberration and lateral chromatic aberration to be appropriately corrected.

The imaging lens of the present embodiment is configured to satisfy conditional formula (1) below:

$$60.0 < vd1 + 26*Nd1 < 85.0 \quad (1),$$

where $vd1$: the Abbe number with respect to the d-line of the material of the first lens L1, and $Nd1$: the refractive index with respect to the d-line of the material of the first lens L1.

Satisfying the upper limit defined by conditional formula (1) reduces the amount of rare earth contained in the material of the first lens L1. This enables a material that achieves cost reduction and that has acid resistance to be selected. Satisfying the lower limit defined by conditional formula (1) prevents the refractive index of the material of the first lens L1 from excessively decreasing and facilitates processing the shapes of the first lens and the second lens to obtain necessary powers. As the result, both lateral chromatic aberration and longitudinal chromatic aberration can be corrected favorably.

A power and shape of each lens of the first lens L1 through the fifth lens L5 are suitably set in the imaging lens of the present embodiment, and conditional formula (1) is satisfied as described above. This enables the first lens L1 to be constituted by a relatively cheap material and enables the lens system to be manufactured at low cost. Furthermore, in the lens system, sufficiently wide angle of view can be achieved and various aberrations including spherical aberration, field curvature, and distortion can be favorably corrected. Further, according to the imaging lens of the present embodiment, high resolution can be obtained over a wide range of the imaging area. Accordingly, the imaging lens of the represent embodiment can be compatible with the recent image sensors in which the number of pixels has been increased.

It is preferable for the imaging lens according to the present embodiment to further have configurations described below. Note that preferably, the imaging lens of the present invention may have a configuration in which any one of conditional formulas below is satisfied or may have a configuration in which an arbitrary combination of two or more of the conditional formulas are satisfied.

In the imaging lens of the present embodiment, it is preferable for at least one surface of each of the second lens L2, the third lens L3, the fourth lens L4 and the fifth lens L5 to have an aspherical surface shape. Configuring at least one surface of each of the second lens L2, the third lens L3, the fourth lens L4 and the fifth lens L5 to have an aspherical surface shape enables high resolution to be obtained while shortening the total length in the direction of the optical axis of the optical system. Further, this enables various aberrations such as spherical aberration, field curvature, distortion, and the like to be corrected favorably with a small number of lenses. In addition, it is preferable for both surfaces of each of the second lens L2, the third lens L3, the fourth lens L4 and the fifth lens L5 to have aspherical surface shapes to perform more preferable aberration correction.

It is preferable for the second lens L2 to have a biconcave shape. This is advantageous from the viewpoint of securing back focus because a great negative refractive power can be imparted to the second lens L2 without decreasing the absolute values of the radii of curvature of the object-side surface and the image-side surface of the second lens L2.

The second lens L2 may be a negative meniscus shape with a concave surface toward the image side. Such a configuration can suppress the occurrence of spherical aberration due to excessive correction by the first lens L1 and the second lens L2.

It is preferable for the object-side surface of the third lens L3 to be of a convex shape. This enables longitudinal chromatic aberration and lateral chromatic aberration to be corrected while suppressing the occurrence of astigmatism.

The third lens L3 may be of a biconvex shape. This configuration is advantageous from the viewpoint of correcting distortion and lateral chromatic aberration.

Further, it is possible for the fourth lens L4 and the fifth lens L5 of the rear group G2 to have either of a configuration in which they are cemented together and a configuration in which they are not cemented together. However, the configuration in which they are not cemented together is advantageous from the viewpoint of enhancing a degree of freedom of designing. However, it is preferable for the fourth lens L4 and the fifth lens L5 to have the configuration in which they are cemented together to correct chromatic aberration favorably and reduce the size of the lens system in the direction of the optical axis. Further, configuring the fourth lens L4 and the fifth lens L5 to be a cemented lens eliminates the need for an interval ring which holds these two lenses. Further, it will be possible to avoid deterioration in performance due to relative eccentricity between the fourth lens L4 and the fifth lens L5. This enables assembly properties to be improved and variations in performance to be suppressed, which is advantageous from the viewpoint of cost.

It is preferable for the fourth lens L4 to be of a biconcave shape with a surface, the absolute value of the radius of curvature of which is small, toward the image side and for the fifth lens L5 to be of a biconvex shape. In such a configuration, a joint surface formed by the fourth lens L4 and and the fifth lens L5 is of a convex shape facing the object side in the paraxial region. This is advantageous from the viewpoint of correcting lateral chromatic aberration.

It is preferable for the joint surface formed by the fourth lens L4 and the fifth lens L5 to be of an aspherical surface shape in which refractive power becomes weaker at positions further away from the optical axis. This enables the absolute value of the radius of curvature of the joint surface in the paraxial region to be decreased, resulting in longitudinal chromatic aberration being corrected favorably.

It is preferable for the imaging lens according to the present embodiment to satisfy conditional formulas (2) through (8).

$$0.15 < f3/L < 0.26 \quad (2)$$

$$d4/L < 0.07 \quad (3)$$

$$vd2 > 50 \quad (4)$$

$$vd3 < 35 \quad (5)$$

$$vda > 50 \quad (6)$$

$$vdb < 35 \quad (7)$$

$$80.0 < vd1 + 35*Nd1 < 96.0 \quad (8),\text{ where}$$

f3: the focal length of the third lens L3,
L: the distance from the object-side surface of the first lens L1 to the imaging plane along the optical axis (the back focus corresponds to an air converted length).
d4: the distance between the second lens L2 and the third lens L3 along the optical axis,
vd2: the Abbe number with respect to the d-line of the material of the second lens L2,
vd3: the Abbe number with respect to the d-line of the material of the third lens L3,
vda: the Abbe number with respect to the d-line of the material of the positive lens of the rear group G2,
vdb: the Abbe number with respect to the d-line of the material of the negative lens of the rear group G2,
vd1: the Abbe number with respect to the d-line of the material of the first lens L1, and
Nd1: the refractive index with respect to the d-line of the material of the first lens L1.

Satisfying the upper limit defined by conditional formula (2) enables lateral chromatic aberration to be corrected favorably. Satisfying the lower limit defined by conditional formula (2) enables longitudinal chromatic aberration to be corrected favorably.

Satisfying the upper limit defined by conditional formula (3) facilitates reducing the total length of the lens while maintaining aberration favorably.

Satisfying conditional formulas (4) through (7) enables both longitudinal chromatic aberration and lateral chromatic aberration to be corrected favorably.

In particular, satisfying conditional formula (5) enables longitudinal chromatic aberration caused by the first lens L1 to be corrected favorably.

Satisfying the upper limit defined by conditional formula (8) reduces the amount of rare earth contained in the material of the first lens L1. This enables a material that achieves cost reduction and that has acid resistance to be selected. Satisfying the lower limit defined by conditional formula (8) prevents the refractive index of the material of the first lens L1 from excessively decreasing and facilitates processing the shapes of the first lens and the second lens to obtain necessary powers. As the result, both lateral chromatic aberration and longitudinal chromatic aberration can be corrected favorably.

Further, it is preferable for conditional formula (5-1) to be satisfied. Satisfying conditional formula (5-1) enables the advantageous effects similar to those obtained by satisfying conditional formula (5) to be obtained or enhanced further.

$$vd3 < 27 \quad (5-1).$$

Note that the materials of lenses that satisfy conditional formula (1) or (8) do not impair the purpose of the present application although relatively expensive materials are included therein. This is because many of the materials have high acid resistance and are relatively light.

In the imaging lens of the present invention, it is preferable for the full angle of view to be greater than 200 degrees. The full angle view is twice as great as the angle formed by a chief ray of the off-axis rays 3 at the maximum angle of view and the optical axis Z. Configuring the lens system to have a wide angle of view with a full angle of view greater than 200 degrees will enable the lens system to meet recent demands for wider angles of view.

For example, when the imaging lens is used in severe environments as vehicle mounted cameras, surveillance cameras, and the like, there is demand for the first lens L1 disposed on the most-object side to be made of a material which is resistant to surface deterioration caused by wind and rain, changes in temperature due to direct sunlight, and chemical agents such as oil, a detergent, and the like, i.e., a material which has high water resistance, weather resistance, acid resistance, chemical resistance, and the like. For example, it is preferable for a material having 1 of the acid resistance class SR based on ISO8424: 1996 to be used. Further, it is preferable for a glass having class 1 of a powder method water resistance specified by Japan Optical Glass Manufactures' Association to be used. Further, there are cases in which the first lens L1 is desired to be made of a material which is hard enough not to break. Configuring the material to be a glass enables the aforementioned demands to be satisfied. Alternatively, the material for the first lens L1 may be a transparent ceramic.

Note that a protection means for improving the strength, scratch resistance, and chemical resistance may be provided on the object-side surface of the first lens L1. In such a case, the material of the first lens L1 may be plastic. Such protection means may be a hard coat or a water-repelling coat.

It is preferable for the materials of the second lens L2, the third lens L3, the fourth lens L4 and the fifth lens L5 to be plastic. In such a case, an aspherical surface shape can be accurately manufactured and reduction in weight and cost can be achieved.

When plastics are applied for the materials, it is preferable for plastic materials which have low water absorption rates and low birefringence to be selected. Selecting plastic materials having low water absorption rates can reduce changes in performance due to water absorption as much as possible, and selecting plastic materials having low birefringence will prevent resolution from deteriorating. To satisfy these conditions, it is preferable for the materials of the second lens L2 and the fourth lens L4 to be cycloolefin-based or cyclic olefin-based plastics, and for the materials of third lens L3 and the fifth lens L5 to be polycarbonate-based or polyester-based plastics.

When a plastic is applied for at least any one of the second lens L2, the third lens L3, the fourth lens L4, and the fifth lens L5, a nanocomposite material in which particles smaller than the wavelength of light are mixed into plastics may be used.

In the imaging lens of the present embodiment, an antireflection film may be applied to each lens to reduce ghost light and the like. In this case, for example, in the imaging lens as shown in FIG. 1, the thickness of the antireflection film at the peripheral portion is less than that of the center of lens at each of the image-side surface of the first lens L1, the image-side surface of the second lens L2, and the object-side surface of the third lens L3. This is because angles formed by tangential lines on the respective surfaces at the peripheral portions and the optical axis are small. Accordingly, an antireflection film, in which reflectance of wavelength of 600 nm through 900 nm is the lowest in the vicinity of the center, is applied to one or more surfaces including the image-side surface of the first lens L1 among the aforementioned three surfaces. This enables reflectance to be decreased averagely in the whole effective diameter and ghost light to be reduced. Alternatively, a multi-layer film coating, in which the reflectance in the range of visible light up to approximately 900 nm is suppressed, may be applied. Alternatively, an antireflection film produced by a wet process, by which a film thickness can be uniformized, may be applied.

Note that if the wavelength, reflectance of which becomes the lowest in the vicinity of the center, is shorter than 600 nm, the wavelength, reflectance of which becomes the lowest at the peripheral portion, will become too short. Accordingly, the reflectance at the long-wavelength side becomes high, resulting in reddish ghosts becoming likely to occur. Meanwhile, if the wavelength, the reflectance of which becomes the lowest in the vicinity of the center, is longer than 900 nm, the wavelength, the reflectance of which becomes the lowest at the center portion, will become too long. Accordingly, the reflectance on the short-wavelength side will become high, resulting in images turning reddish, and bluish ghost light becoming likely to occur. In such a manner, even when the wavelength, the reflectance of which is the lowest in the vicinity of the center, is shorter than 600 nm or longer than 900 nm, the usage of a multi-layer film coating, in which the reflectance in the range of visible light up to approximately 900 nm is suppressed, can prevent images from turning reddish, and prevent bluish ghost light from occurring. Further, the usage of the antireflection film produced by a wet process, by which a film thickness can be uniformized, exhibits a similar advantageous effect.

Further, in the imaging lens of the present embodiment, rays which pass the outside of the effective diameters between the respective lenses will become stray light and reach the imaging plane, resulting in turning to ghosts. Accordingly, it is preferable for a light cutting means for shielding the stray light to be provided as necessary. As this light cutting means, an opaque paint may be applied onto portions of the outside of the effective diameters of the lenses, or an opaque plate may be provided therein, for example. Alternatively, opaque plates may be provided as the light cutting means on optical paths of the rays which become stray light.

Note that a filter which cuts blue light from ultraviolet light or an IR (InfraRed) cutting filter which cuts infrared light may be provided between the lens system and the image sensor 5 according to the application of the imaging lens 1. A coating which has the same characteristics as those of the filters above may be applied onto the lens surface.

FIG. 1 shows the example in which an optical member PP that presumes various types of filters, and the like is disposed between the lens system and the image sensor 5, but these various types of filters may be disposed between the respective lenses, instead. Alternatively, a coating, which exhibits the same effects as the various types of filters, may be applied onto the lens surfaces of any of the lenses included in the imaging lens.

EXAMPLES

Next, Numerical Examples of the imaging lens of the present invention will be described.

Example 1

An arrangement of lens groups of an imaging lens of Example 1 is illustrated in FIG. 1. As illustrated in FIG. 1, the imaging lens of Example 1 consists of a front group G1 that consists essentially of a negative first lens L1 having a meniscus shape with a convex surface toward the object side, a second lens L2 having a biconcave shape, and a third lens L3 having a biconvex shape; an aperture stop St; and a rear group G2 that consists essentially of a fourth lens L4 having a biconcave shape with a concave surface, the absolute value of the radius of curvature of which is small, toward the image side, and a fifth lens L5 having a biconvex shape, in this order from the object side. The fourth lens L4 and the fifth lens L5 are cemented to each other, and the combined focal length thereof is positive. Further, both surfaces of the second lens L2 and the third lens L3, the object-side surface of the fourth lens L4, and the image-side surface of the fifth lens L5 are aspherical. Configuring both surfaces of the second lens L2 to be aspherical is advantageous from the viewpoint of correcting distortion and astigmatism. Configuring both surfaces of the third lens L3 and the image-side surface of the fifth lens L5 to be aspherical is advantageous from the viewpoint of correcting spherical aberration.

Tables 1, 2, and 3 show specific lens data corresponding to a configuration of the imaging lens according to Example 1. Table 1, shows basic lens data thereof, Table 2 shows data regarding specs, and Table 3 shows data regarding aspherical surface coefficients.

In basic lens data, the column of Si shows the i-th (i=1, 2, 3, . . . ) surface number, the value of i sequentially increasing from a surface of the constituent element at the most object side, which is designated as 1, toward the image side. The column Ri shows the radii of curvature of the i-th surface, and the column Di shows the distances between i-th surfaces and i+1 st surfaces along the optical axis Z. Note that an optical member PP is also shown therein. Further, the sign of the radius of curvature is positive in the case that a surface shape has a convex surface toward the object side, and negative in the case that a surface shape has a convex toward the image side. In each Example, Ri and Di in lens data (i=1, 2, 3, . . . ) respectively correspond to signs Ri and Di of the lens cross-sectional views. Further, the column Ndj shows the refractive indices of j-th (j=1, 2, 3, . . . ) lenses with respect to the d-line (wavelength: 587.6 nm), the value of j sequentially increasing from the constituent element at the most object side, which is designated as 1, toward the image side in lens data of Table 1. The column vdj shows the Abbe numbers of j-th optical elements with respect to the d-line. Note that the lens data also shows an aperture stop St. The column of the radii of curvature of a surface corresponding to the aperture stop St indicates ∞.

In the lens data of Table 1, the mark "*" which is indicated on the left side of surface numbers shows that the lens surfaces, the surface numbers of which are indicated with the mark "*", are of an aspherical surface shape. In the basic lens data of Table 1, numerical values of paraxial radii of curvature are shown as the radii of curvature of these aspherical surfaces.

Note that the material which constitutes the first lens L1 is S-LAM 66 by OHARA Inc. (Nd is 1.80100, vd is 34.97, the specific gravity is 3.55, and the acid resistance class SR of ISO8424: 1996 is 4) in Example 1.

Values of the paraxial focal length f' (mm), the back focus Bf', the F number (FNo.), and the angle of view (2ω) are shown in Table 2 as data regarding specs of the imaging lens according to Example 1.

Table 3 shows data regarding aspherical surface coefficients of the imaging lens according to Example 1. Surface numbers of the aspherical surfaces and aspherical surface coefficients with respect to the aspherical surfaces are shown therein. Note that "E-n" (n: integer) in each of the numerical values of the aspherical surface coefficients means "×10$^{-n}$". Note that the aspherical surface coefficients are the values of respective coefficients KA, Am (m=3, 4, 5, . . . 20) in the aspherical surface formula below:

$$Zd = C \cdot h^2 / \{1 + (1 - KA \cdot C^2 \cdot h^2)^{1/2}\} + \Sigma Am \cdot h^m$$

where,

Zd: the depth of an aspheric surface (the length of a perpendicular line drawn from a point on an aspheric surface with a height h to a plane perpendicular to the optical axis which contacts the peak of the aspheric surface)

h: height (the distance from the optical axis to a lens surface)

C: an inverse number of a paraxial radius of curvature

KA, Am: aspherical surface coefficients.

The aspheric surface of the imaging lens according to Example 1 is expressed by effectively applying orders of A3 through A20 to an aspherical surface coefficient Am, based on the above aspherical surface formula.

The manner in which the aforementioned Tables 1 through 3 are described is similar to Tables 4 through 15 to be described later.

In each of Tables below, degrees (°) are used as the unit of angles and mm is used as the unit of length as described above, but other appropriate units may also be used, as optical systems are usable even when they are proportionally enlarged or miniaturized.

TABLE 1

Example 1/Lens Data

| Si | Ri | Di | Ndj | vdj |
|---|---|---|---|---|
| 1 | 13.00837 | 1.40000 | 1.80100 | 34.97 |
| 2 | 4.00250 | 2.56012 | | |
| *3 | −1.11949 | 1.10000 | 1.53331 | 55.89 |
| *4 | 19.17052 | 0.44392 | | |
| *5 | 1.92127 | 1.63858 | 1.61399 | 25.53 |
| *6 | −9.05669 | 0.22364 | | |
| 7(Stop) | ∞ | 0.26585 | | |
| *8 | −51.21157 | 0.19999 | 1.61399 | 25.53 |
| 9 | 2.50000 | 1.39097 | 1.53391 | 55.89 |
| *10 | −1.04814 | 1.50000 | | |
| 11 | ∞ | 0.80000 | 1.51680 | 64.20 |
| 12 | ∞ | 0.01349 | | |

TABLE 2

Example 1/Specs(d-line)

| | |
|---|---|
| f' | 0.897 |
| Bf' | 2.041 |
| FNo. | 2.98 |
| 2ω[°] | 221.0 |

TABLE 3

Example 1/Aspherical Surface Coefficients

| | Surface Numbers | | | | | |
|---|---|---|---|---|---|---|
| | 3 | 4 | 5 | 6 | 8 | 10 |
| KA | 0.0000000E+00 | 0.0000000E+00 | 0.0000000E+00 | 0.0000000E+00 | 0.0000000E+00 | 0.0000000E+00 |
| A3 | 3.4777159E−01 | 7.0330361E−01 | 2.8402519E−01 | −3.5282441E−02 | −1.1626986E−01 | 4.5806684E−02 |
| A4 | −9.3768232E−02 | −6.1524489E−01 | −3.6214859E−01 | 2.2034950E−01 | 1.1900308E+00 | −6.3459192E−01 |
| A5 | 8.6882617E−03 | 3.4047821E−01 | 3.3705968E−01 | −2.6775249E−01 | −8.3082043E+00 | 2.3548128E+00 |
| A6 | −6.3669379E−04 | 4.2486245E−01 | 8.1354814E−02 | −1.6102140E−01 | 2.7110213E+01 | −3.8668312E+00 |
| A7 | −3.0307945E−03 | −9.5608106E−02 | −3.7671674E−01 | 4.9665734E−01 | −5.2688520E+01 | 1.7953687E+00 |
| A8 | 1.4047834E−03 | −3.2961291E−01 | 2.8727218E−01 | −3.7493467E−01 | 1.0111172E+02 | 1.0116339E+00 |
| A9 | 1.1761894E−04 | −7.5296742E−02 | −9.7273002E−02 | 1.8478825E−02 | −3.2239884E+02 | 1.0754118E+00 |
| A10 | −4.7108610E−05 | 8.4009406E−02 | 2.9479427E−02 | −4.2894826E−01 | 6.2736742E+02 | −1.4822301E+00 |
| A11 | −1.1475705E−05 | 6.4614154E−02 | −2.8523492E−02 | 4.2643478E−01 | 8.8271170E+02 | −4.7537600E+00 |
| A12 | −2.9185795E−06 | −8.8853164E−03 | 5.5459384E−03 | 8.8392736E−01 | −6.8106702E+03 | 6.3219571E+00 |
| A13 | −1.4212873E−06 | 1.7241785E−02 | −6.1104054E−03 | −1.3970182E+00 | 1.1361002E+04 | −1.4434934E+00 |
| A14 | 9.0021277E−07 | −7.5158723E−03 | 3.9724733E−03 | 7.6723690E−01 | −4.3452542E+03 | −1.9690042E−02 |
| A15 | −4.5183816E−08 | −3.1171951E−03 | 3.7599971E−03 | −3.3486020E−01 | 3.8967801E+03 | −6.0367060E−01 |
| A16 | 3.4283322E−08 | −7.5547362E−03 | 1.3342210E−03 | 4.4711171E−01 | −2.8341829E+04 | 5.5001026E−02 |

TABLE 3-continued

Example 1/Aspherical Surface Coefficients

| | Surface Numbers | | | | | |
|---|---|---|---|---|---|---|
| | 3 | 4 | 5 | 6 | 8 | 10 |
| A17 | 2.8803282E−09 | 1.6795484E−03 | −2.9687676E−03 | −5.6435481E−01 | 1.5010206E+04 | −3.5746987E−01 |
| A18 | −4.6690012E−09 | 5.6153744E−04 | 5.6356413E−05 | 1.1448305E+00 | 6.7666770E+04 | 6.8247280E−01 |
| A19 | −5.8659603E−10 | 1.2319302E−03 | −2.6971334E−04 | −9.1234912E−02 | −9.9396762E+04 | −2.4284950E−01 |
| A20 | 2.5241431E−10 | −5.1443141E−04 | 4.4254667E−04 | −6.0334621E−01 | 3.9883631E+04 | 1.2240875E−03 |

Example 2

Figure 2:
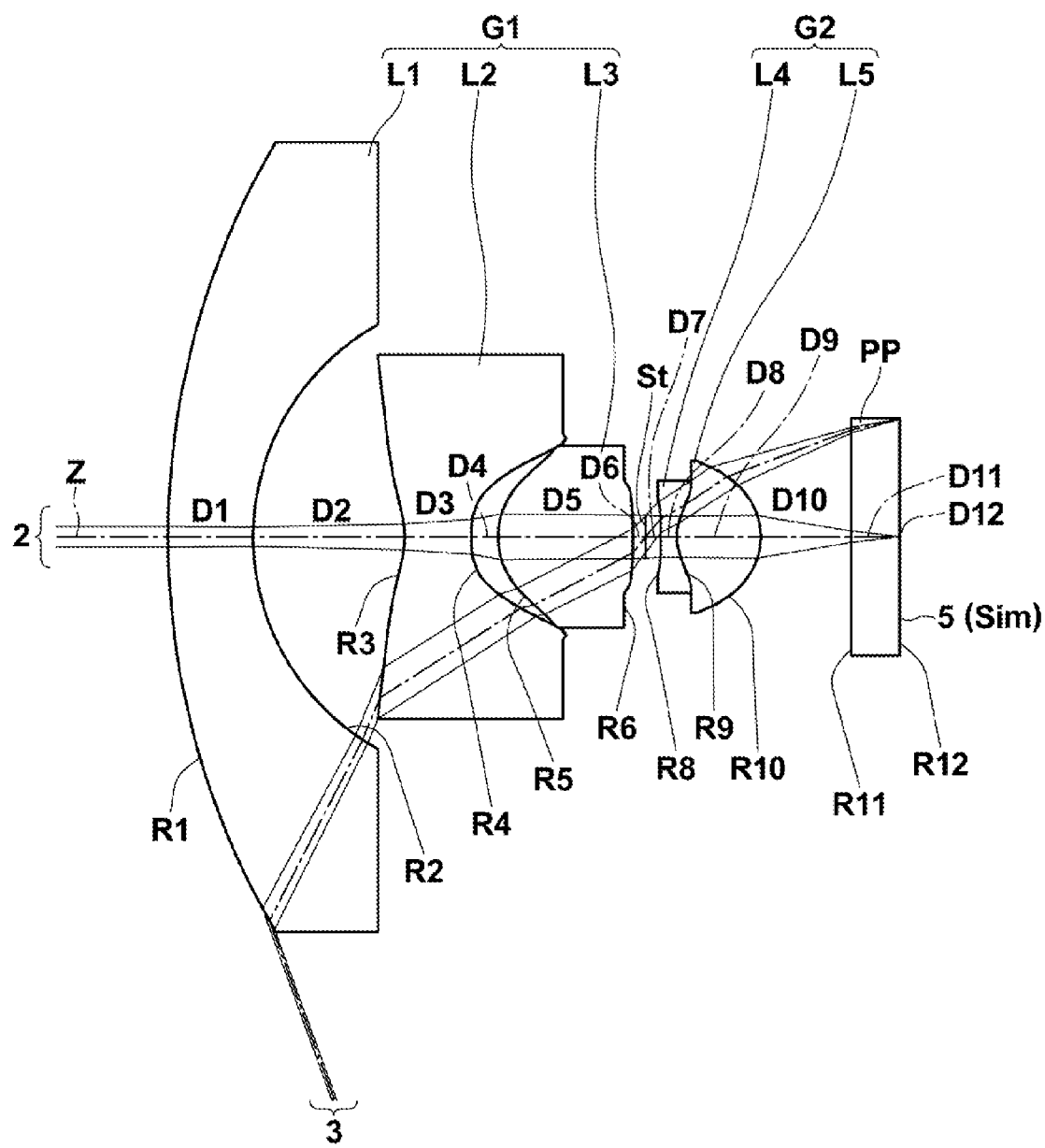
FIG. 2 is a cross-sectional view illustrating a lens configuration and optical paths of an imaging lens of Example 2 of the present invention.

FIG. 2 is a view illustrating a configuration of an imaging lens according to Example 2 of the present invention. The imaging lens according to Example 2 has the configuration substantially similar to that of the imaging lens according to Example 1. However, the imaging lens according to Example 2 differs from that of Example 1 in that the fourth lens L4 is a negative lens having a meniscus shape with a concave surface toward the image side, and the image-side surface of the fourth lens L4 and the object-side surface of the fifth lens L5 are aspherical. Note that the material which constitutes the first lens L1 is S-TIH6 by OHARA Inc. (Nd is 1.80518, νd is 25.42, the specific gravity is 3.37, and the acid resistance class SR of ISO8424: 1996 is 1) in Example 2.

Table 4 shows basic lens data of the imaging lens of Example 2. Table 5 shows data regarding specs of the imaging lens of Example 2. Table 6 shows data regarding aspherical surface coefficients of the imaging lens of Example 2.

TABLE 4

Example 2/Lens Data

| Si | Ri | Di | Ndj | νdj |
|---|---|---|---|---|
| 1 | 12.80498 | 1.40000 | 1.80518 | 25.42 |
| 2 | 4.00250 | 2.49839 | | |

TABLE 4-continued

Example 2/Lens Data

| Si | Ri | Di | Ndj | νdj |
|---|---|---|---|---|
| *3 | −1.11120 | 1.10000 | 1.53391 | 55.89 |
| *4 | 149.75524 | 0.44392 | | |
| *5 | 1.66808 | 2.21710 | 1.61399 | 25.53 |
| *6 | −9.63810 | 0.21043 | | |
| 7(Stop) | ∞ | 0.24542 | | |
| *8 | 21.11093 | 0.26771 | 1.61399 | 25.53 |
| *9 | 0.80000 | 1.38468 | 1.53391 | 55.89 |
| *10 | −1.10808 | 1.48987 | | |
| 11 | ∞ | 0.80000 | 1.51680 | 64.20 |
| 12 | ∞ | 0.00000 | | |

TABLE 5

Example 2/Specs(d-line)

| | |
|---|---|
| f | 1.036 |
| Bf | 2.003 |
| FNo. | 2.99 |
| 2ω[°] | 219.8 |

TABLE 6

Example 2/Aspherical Surface Coefficients

| | Surface Numbers | | | | | | |
|---|---|---|---|---|---|---|---|
| | 3 | 4 | 5 | 6 | 8 | 9 | 10 |
| KA | 0.0000000E+00 | 0.0000000E+00 | 0.0000000E+00 | 0.0000000E+00 | 0.0000000E+00 | −1.9203501E+00 | 0.0000000E+00 |
| A3 | 3.4745293E−01 | 7.2110592E−01 | 2.9069272E−01 | −2.9774363E−02 | −9.7462932E−02 | 0.0000000E+00 | 4.3064316E−02 |
| A4 | −9.3948279E−02 | −6.0478643E−01 | −3.6667355E−01 | 1.8519691E−01 | 1.0101825E+00 | −5.2113515E−02 | −6.5734861E−01 |
| A5 | 8.8066463E−03 | 3.5007985E−01 | 3.3393181E−01 | −2.8976648E−01 | −8.4379333E+00 | 0.0000000E+00 | 2.3387933E+00 |
| A6 | −6.2876665E−04 | 4.2228496E−01 | 8.0080503E−02 | −1.7739017E−01 | 2.7305829E+01 | −1.8713783E−01 | −3.8672372E+00 |
| A7 | −3.0204641E−03 | −9.8681251E−02 | −3.8142184E−01 | 4.5667387E−01 | −5.2562756E+01 | 0.0000000E+00 | 1.7952187E+00 |
| A8 | 1.4045147E−03 | −3.3132289E−01 | 2.8707589E−01 | −4.9138816E−01 | 1.0314536E+02 | −5.5899152E−02 | 1.0059027E+00 |
| A9 | 1.1583220E−04 | −7.2368305E−02 | −9.1477082E−02 | −2.1851501E−01 | −3.2821636E+02 | 0.0000000E+00 | 1.0725304E+00 |
| A10 | −4.6920240E−05 | 8.4750035E−02 | 2.7293199E−02 | 1.4640117E+00 | 6.2528885E+02 | 1.1321986E−01 | −1.4844308E+00 |
| A11 | −1.1675615E−05 | 6.6082909E−02 | −2.9170552E−02 | −3.9312835E−01 | 8.8389422E+02 | | −4.7517735E+00 |
| A12 | −2.9386526E−06 | −1.0281102E−02 | 3.1472117E−03 | 1.7625415E+00 | −6.8087390E+03 | | 6.3192355E+00 |
| A13 | −1.4191474E−06 | 1.5465821E−02 | −9.2299132E−04 | −3.5667330E+00 | 1.1403143E+04 | | −1.4444456E+00 |
| A14 | 9.0422430E−07 | −7.9625113E−03 | 4.8207165E−03 | 1.0131312E+00 | −4.3625838E+03 | | −2.0179227E−02 |
| A15 | −3.8880713E−08 | −2.9044288E−03 | 4.8631609E−03 | −1.5362131E+00 | 3.5802785E+03 | | −5.9716255E−01 |
| A16 | 3.3660292E−08 | −6.5753664E−03 | −8.6756124E−04 | −1.0379599E−01 | −2.7766523E+04 | | 5.5257528E−02 |
| A17 | 2.8042455E−09 | 1.4018214E−03 | −1.6937590E−03 | −4.8435951E−02 | 1.5197334E+04 | | −3.5869603E−01 |
| A18 | −4.6407802E−09 | 4.2607474E−04 | −1.8348038E−04 | 4.3080562E−01 | 6.7576822E+04 | | 6.8499642E−01 |
| A19 | −5.8173977E−10 | 1.1986131E−03 | −1.5121519E−03 | 3.0942374E+00 | −1.0128066E+05 | | −2.4665518E−01 |
| A20 | 2.3560903E−10 | −4.4275825E−04 | 1.0408899E−03 | −1.5265552E+00 | 4.1475539E+04 | | 2.2592168E−03 |

Example 3

Figure 3:
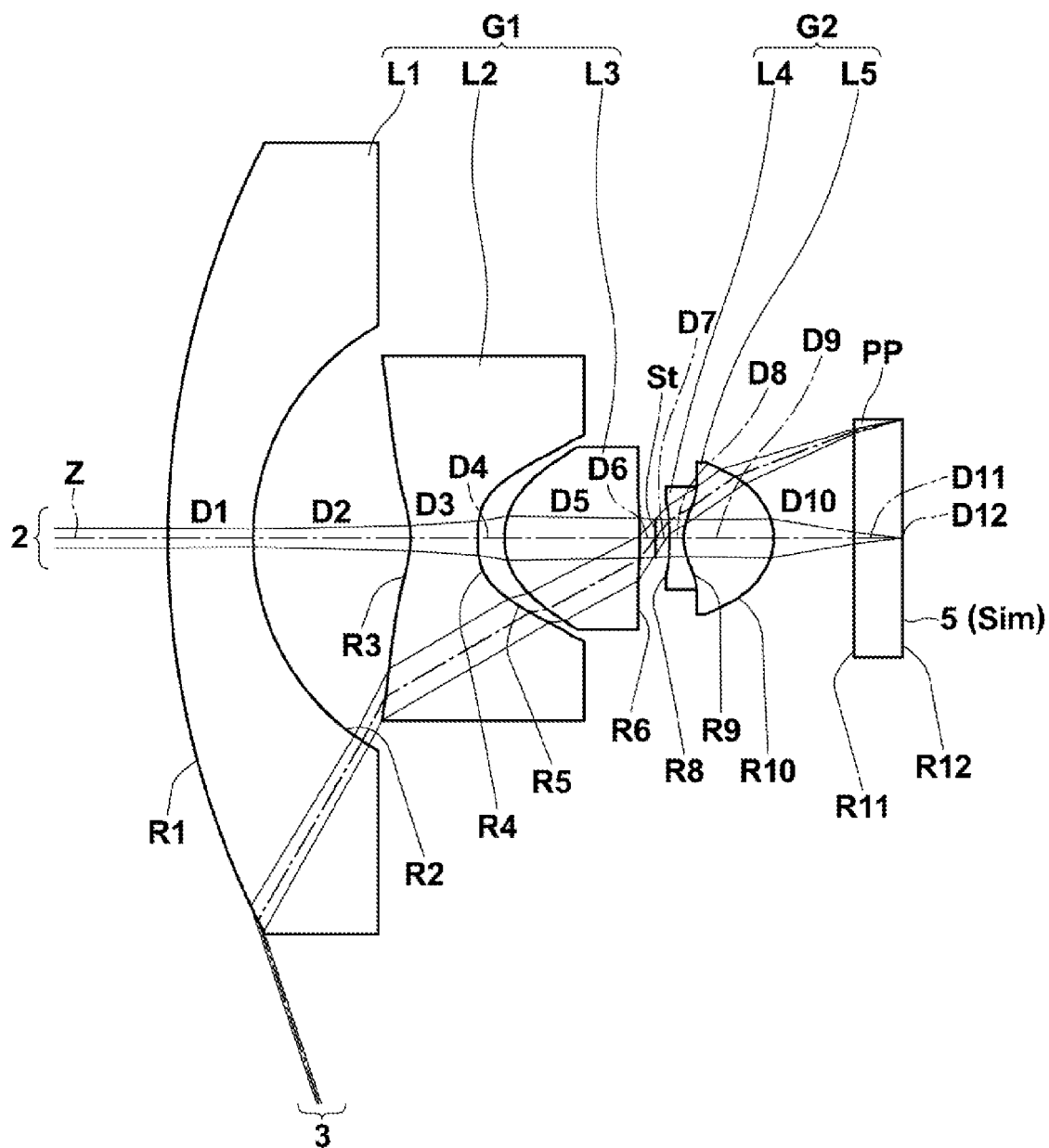
FIG. 3 is a cross-sectional view illustrating a lens configuration and optical paths of an imaging lens of Example 3 of the present invention.

FIG. 3 is a view illustrating a configuration of an imaging lens according to Example 3 of the present invention. The imaging lens according to Example 3 has the configuration substantially similar to that of the imaging lens according to Example 1. However, the imaging lens of Example 3 differs from that of Example 1 in that the second lens L2 is a negative lens having a meniscus shape with a concave surface toward the object side, and the image-side surface of the fourth lens L4 and the object-side surface of the fifth lens L5 are aspherical. Note that the material which constitutes the first lens L1 is S-NPH1 by OHARA Inc. (Nd is 1.80809, vd is 22.76, the specific gravity is 3.29, and the acid resistance class SR of ISO8424: 1996 is 1) in Example 3.

Table 7 shows basic lens data of the imaging lens of Example 3. Table 8 shows data regarding specs of the imaging lens of Example 3. Table 9 shows data regarding aspherical surface coefficients of the imaging lens of Example 3.

TABLE 7

Example 3/Lens Data

| Si | Ri | Di | Ndj | vdj |
|---|---|---|---|---|
| 1 | 14.06589 | 1.40000 | 1.80809 | 22.76 |
| 2 | 4.00250 | 2.59413 | | |
| *3 | −1.10631 | 1.10000 | 1.53391 | 55.89 |
| *4 | −290.70540 | 0.44392 | | |
| *5 | 1.53788 | 2.22119 | 1.61399 | 25.53 |
| *6 | −10.02349 | 0.26261 | | |
| 7(Stop) | ∞ | 0.22755 | | |
| *8 | −27.10503 | 0.23291 | 1.61399 | 25.53 |
| *9 | 0.80000 | 1.48368 | 1.53391 | 55.89 |
| *10 | −0.99081 | 1.31831 | | |
| 11 | ∞ | 0.80000 | 1.51680 | 64.20 |
| 12 | ∞ | 0.00030 | | |

TABLE 8

Example 3/Specs(d-line)

| | |
|---|---|
| f | 0.978 |
| Bf | 1.846 |
| FNo. | 2.99 |
| 2ω[°] | 217.0 |

TABLE 9

Example 3/Aspherical Surface Coefficients

| | Surface Numbers | | | |
|---|---|---|---|---|
| | 3 | 4 | 5 | 6 |
| KA | 0.0000000E+00 | 0.0000000E+00 | 0.0000000E+00 | 0.0000000E+00 |
| A3 | 3.4740071E−01 | 7.4685054E−01 | 2.9944801E−01 | −3.5769569E−02 |
| A4 | −9.3938873E−02 | −6.3858297E−01 | −3.6317090E−01 | 2.2563196E−01 |
| A5 | 8.8065816E−03 | 3.4429211E−01 | 3.3349208E−01 | −2.4942487E−01 |
| A6 | −6.2784536E−04 | 4.2257968E−01 | 7.9584539E−02 | −1.7195600E−01 |
| A7 | −3.0205669E−03 | −9.4236632E−02 | −3.8421180E−01 | 4.5494071E−01 |
| A8 | 1.4043544E−03 | −3.3114085E−01 | 2.8659981E−01 | −5.0695036E−01 |
| A9 | 1.1584959E−04 | −7.2609949E−02 | −9.0917314E−02 | −2.5287623E−01 |
| A10 | −4.6919595E−05 | 8.4084223E−02 | 2.8774014E−02 | 1.3922972E+00 |
| A11 | −1.1652492E−05 | 6.6456199E−02 | −2.8435614E−02 | −6.0551614E−01 |
| A12 | −2.9803691E−06 | −1.0428222E−02 | 3.5612124E−03 | 1.7726686E+00 |
| A13 | −1.4121695E−06 | 1.5479991E−02 | −8.3526118E−04 | −3.5798985E+00 |
| A14 | 9.0438701E−07 | −8.0590797E−03 | 4.9188146E−03 | 1.1591071E+00 |
| A15 | −3.9019651E−08 | −2.8843533E−03 | 5.1261350E−03 | −1.3942035E+00 |
| A16 | 3.3790446E−08 | −6.5387025E−03 | −9.2664629E−04 | 3.6244983E−01 |
| A17 | 2.8244721E−09 | 1.4353379E−03 | −1.7434063E−03 | 6.2105280E−01 |
| A18 | −4.6341164E−09 | 4.0612175E−04 | −2.1625466E−04 | 8.3030079E−01 |
| A19 | −5.8311501E−10 | 1.1627918E−03 | −1.5228753E−03 | 3.9495299E+00 |
| A20 | 2.3423212E−10 | −4.1378208E−04 | 1.0279125E−03 | −3.6943895E+00 |

| | Surface Numbers | | |
|---|---|---|---|
| | 8 | 9 | 10 |
| KA | 0.0000000E+00 | −2.0351413E+00 | 0.0000000E+00 |
| A3 | −1.4081652E−01 | 0.0000000E+00 | 4.8039976E−02 |
| A4 | 1.1780565E+00 | −4.6363539E−02 | −6.8239368E−01 |
| A5 | −8.6127379E+00 | 0.0000000E+00 | 2.3824568E+00 |
| A6 | 2.7106771E+01 | −2.9815931E−01 | −3.9097851E+00 |
| A7 | −5.2954926E+01 | 0.0000000E+00 | 1.8198100E+00 |
| A8 | 1.0260433E+02 | −1.4979027E−02 | 1.0260209E+00 |
| A9 | −3.2275848E+02 | 0.0000000E+00 | 1.0560767E+00 |
| A10 | 6.2479838E+02 | 1.8716752E−01 | −1.4910375E−00 |
| A11 | 8.7183468E+02 | | −4.7561383E+00 |
| A12 | −6.8165261E+03 | | 6.3175594E+00 |
| A13 | 1.1394134E+04 | | −1.4448099E+00 |
| A14 | −4.3140430E+03 | | −1.9942813E−02 |
| A15 | 3.8227193E+03 | | −5.9653535E−01 |
| A16 | −2.8102219E+04 | | 5.6761923E−02 |
| A17 | 1.5225437E+04 | | −3.5729870E−01 |
| A18 | 6.7416521E+04 | | 6.8612550E−01 |

TABLE 9-continued

| Example 3/Aspherical Surface Coefficients | | |
|---|---|---|
| A19 | −1.0142371E+05 | −2.4686773E−01 |
| A20 | 4.1877995E+04 | 1.5150146E−03 |

Example 4

Figure 4:
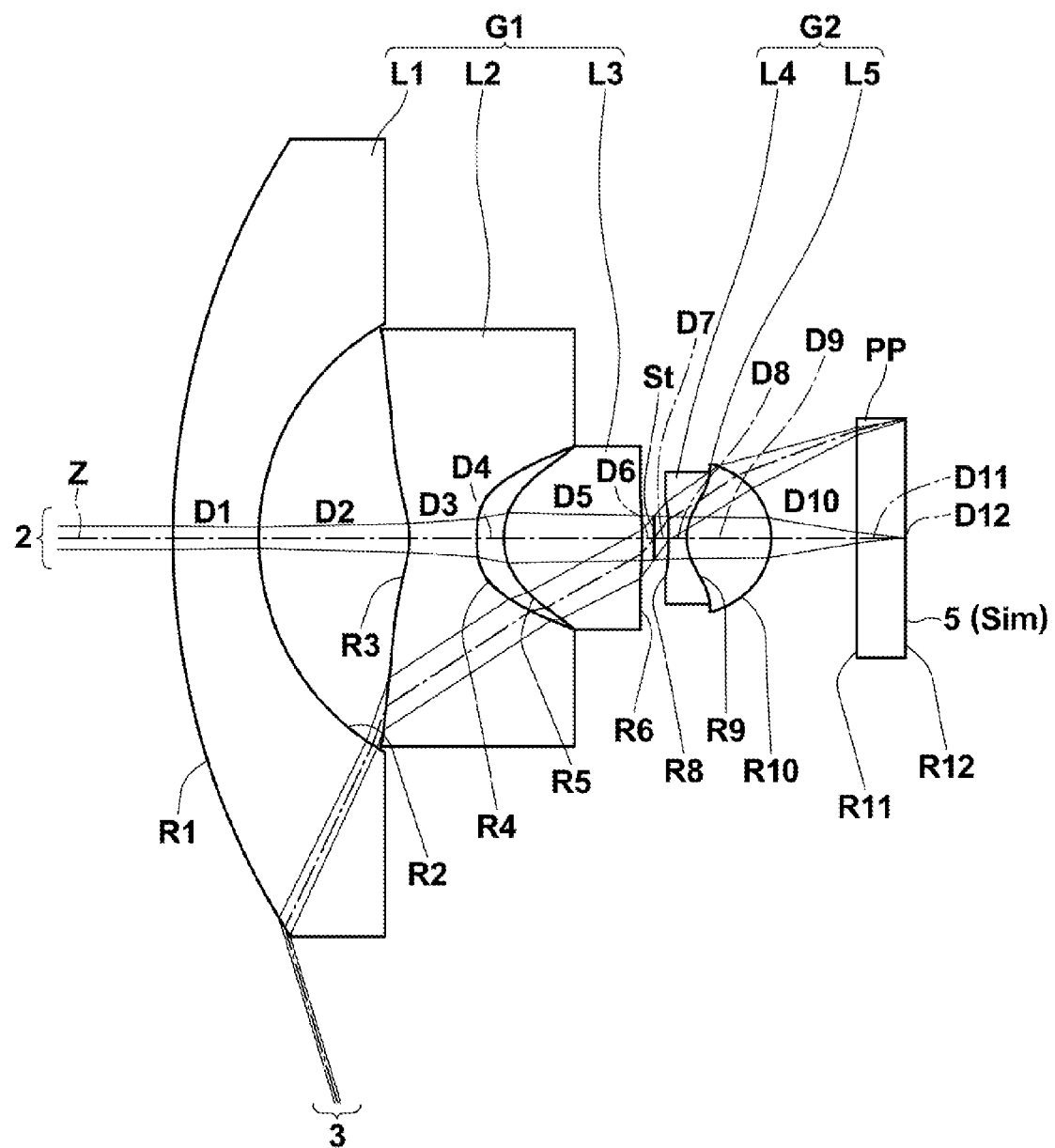
FIG. 4 is a cross-sectional view illustrating a lens configuration and optical paths of an imaging lens of Example 4 of the present invention.

FIG. 4 is a view illustrating a configuration of an imaging lens according to Example 4 of the present invention. The imaging lens according to Example 4 has the configuration substantially similar to that of the imaging lens according to Example 2. However, the imaging lens according to Example 4 differs from that of Example 2 in that the second lens L2 is a negative lens having a meniscus shape with a concave surface toward the object side. Note that the material which constitutes the first lens L1 is S-NMB 55 by OHARA Inc. (Nd is 1.80000, vd is 29.84 the specific gravity is 3.68, and the acid resistance class SR of ISO8424: 1996 is 1) in Example 4.

Table 10 shows basic lens data of the imaging lens of Example 4. Table 11 shows data regarding specs of the imaging lens of Example 4. Table 12 shows data regarding aspherical surface coefficients of the imaging lens of Example 4.

TABLE 10

| Example 4/Lens Data | | | | |
|---|---|---|---|---|
| Si | Ri | Di | Ndj | vdj |
| 1 | 11.98007 | 1.40000 | 1.80000 | 29.84 |
| 2 | 4.00250 | 2.45834 | | |
| *3 | −1.14112 | 1.10000 | 1.53391 | 55.89 |
| *4 | −96.20163 | 0.44392 | | |
| *5 | 1.50312 | 2.25336 | 1.58364 | 30.27 |
| *6 | −9.12366 | 0.19906 | | |
| 7(Stop) | ∞ | 0.23263 | | |
| *8 | 170.98956 | 0.29671 | 1.58364 | 30.27 |
| *9 | 0.80000 | 1.37999 | 1.53391 | 55.89 |
| *10 | −1.21694 | 1.39294 | | |
| 11 | ∞ | 0.80000 | 1.51680 | 64.20 |
| 12 | ∞ | 0.00000 | | |

TABLE 11

| Example 4/Specs(d-line) | |
|---|---|
| f | 1.171 |
| Bf | 1.950 |
| FNo. | 2.99 |
| 2ω[°] | 213.6 |

TABLE 12

| Example 4/Aspherical Surface Coefficients | | | | |
|---|---|---|---|---|
| | Surface Numbers | | | |
| | 3 | 4 | 5 | 6 |
| KA | 0.0000000E+00 | 0.0000000E+00 | 0.0000000E+00 | 0.0000000E+00 |
| A3 | 3.4552557E−01 | 7.1156438E−01 | 3.0619828E−01 | −2.2320013E−02 |
| A4 | −9.4149949E−02 | −5.8646483E−01 | −3.6498788E−01 | 1.8727609E−01 |
| A5 | 8.7859816E−03 | 3.5730973E−01 | 3.3578891E−01 | −2.7589088E−01 |
| A6 | −6.2517172E−04 | 4.2692283E−01 | 7.9935315E−02 | −1.7134878E−01 |
| A7 | −3.0202116E−03 | −9.7560720E−02 | −3.8171158E−01 | 4.5080015E−01 |
| A8 | 1.4050914E−03 | −3.3139557E−01 | 2.8743651E−01 | −4.9724719E−01 |
| A9 | 1.1588631E−04 | −7.2218047E−02 | −9.1068742E−02 | −2.3344535E−01 |
| A10 | −4.6935219E−05 | 8.4787627E−02 | 2.7715854E−02 | 1.3987647E+00 |
| A11 | −1.1698805E−05 | 6.5651463E−02 | −2.9044911E−02 | −4.0100103E−01 |
| A12 | −2.9382935E−06 | −1.0386314E−02 | 3.2115851E−03 | 1.7925005E+00 |
| A13 | −1.4188724E−06 | 1.5405560E−02 | −8.8080981E−04 | −3.5333905E+00 |
| A14 | 9.0423149E−07 | −8.1127632E−03 | 4.8840640E−03 | 1.0576560E+00 |
| A15 | −3.8870584E−08 | −2.9216858E−03 | 4.9679233E−03 | −1.4706644E+00 |
| A16 | 3.3662652E−08 | −6.5905762E−03 | −8.9097442E−04 | 2.2691255E−02 |
| A17 | 2.8234999E−09 | 1.3980910E−03 | −1.7150583E−03 | 1.2987145E−01 |
| A18 | −4.6409684E−09 | 4.2357781E−04 | −2.0113839E−04 | 7.1944609E−01 |
| A19 | −5.8198135E−10 | 1.2382733E−03 | −1.5223976E−03 | 2.7806140E+00 |
| A20 | 2.3569091E−10 | −4.3618144E−04 | 1.0313752E−03 | −2.0662320E+00 |
| | Surface Numbers | | | |
| | 8 | 9 | 10 | |
| KA | 0.0000000E+00 | −8.9026487E−01 | 0.0000000E+00 | |
| A3 | −8.3198881E−02 | 0.0000000E+00 | 3.3331875E−02 | |
| A4 | 1.0410870E+00 | 1.0122655E−02 | −6.6269395E−01 | |
| A5 | −8.3706407E+00 | 0.0000000E+00 | 2.3402353E+00 | |
| A6 | 2.7347711E+01 | −1.2437531E−01 | −3.8567871E+00 | |

TABLE 12-continued

Example 4/Aspherical Surface Coefficients

| | | | |
|---|---|---|---|
| A7 | −5.2595569E+01 | 0.0000000E+00 | 1.7961370E+00 |
| A8 | 1.0277105E+02 | −7.5405985E−02 | 1.0017416E+00 |
| A9 | −3.2950204E+02 | 0.0000000E+00 | 1.0741115E+00 |
| A10 | 6.2377638E+02 | 6.5754693E−02 | −1.4858503E+00 |
| A11 | 8.9143279E+02 | | −4.7522308E+00 |
| A12 | −6.8144396E+03 | | 6.3188834E+00 |
| A13 | 1.1398217E+04 | | −1.4457319E+00 |
| A14 | −4.3799856E+03 | | −2.1916091E−02 |
| A15 | 3.5991523E+03 | | −5.9823081E−01 |
| A16 | −2.7627442E+04 | | 5.4195604E−02 |
| A17 | 1.4929108E+04 | | −3.5705409E−01 |
| A18 | 6.8359276E+04 | | 6.8454423E−01 |
| A19 | −1.0265561E+05 | | −2.4723081E−01 |
| A20 | 4.2179878E+04 | | 3.0881752E−03 |

Example 5

Figure 5:
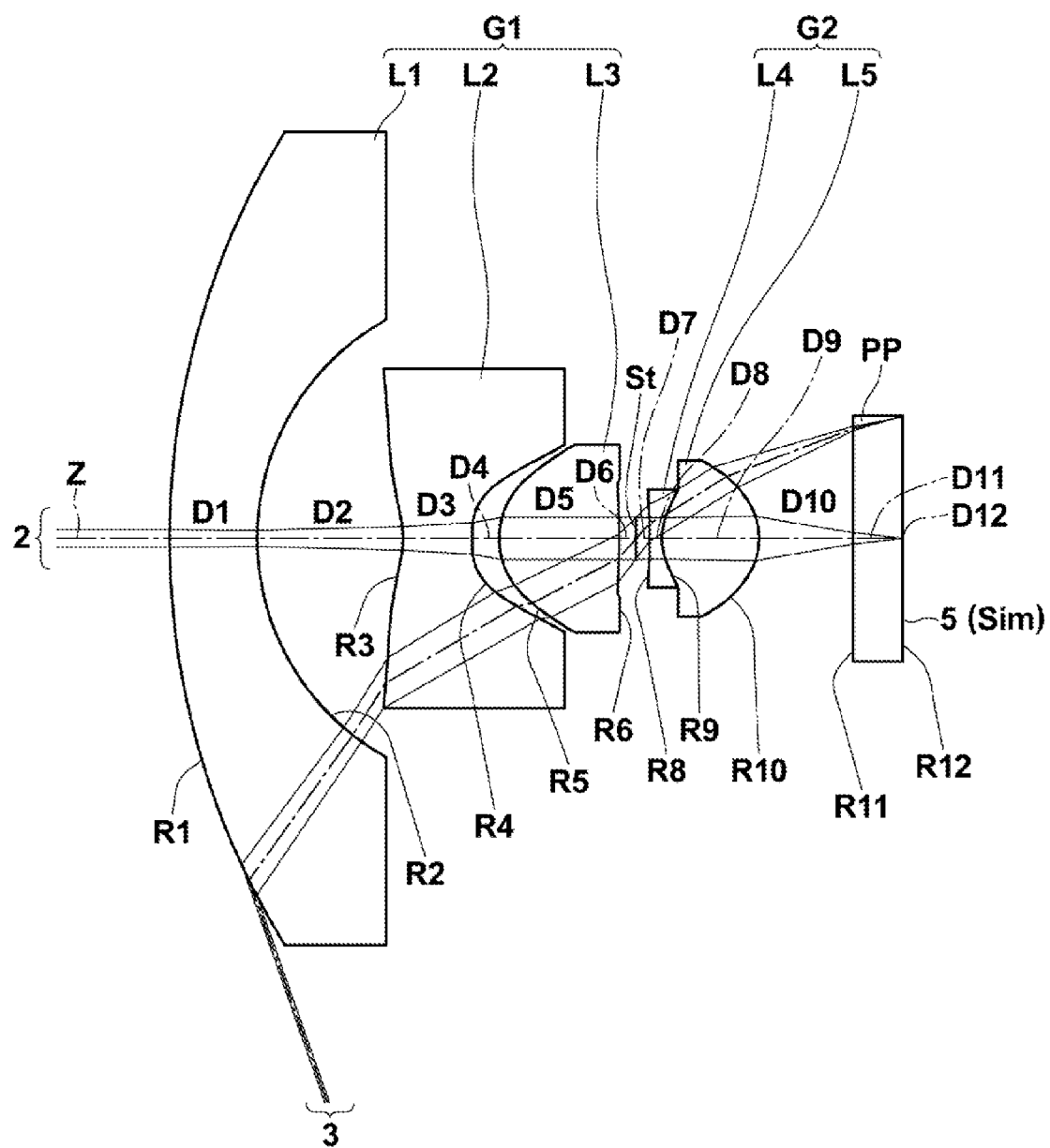
FIG. 5 is a cross-sectional view illustrating a lens configuration and optical paths of an imaging lens of Example 5 of the present invention.

FIG. 5 is a view illustrating a configuration of an imaging lens according to Example 5 of the present invention. The imaging lens according to Example 5 has the configuration substantially similar to that of the imaging lens according to Example 2. Note that the material which constitutes the first lens L1 is LUMICERA© Type-z by Murata Manufacturing Co., Ltd. (Nd is 2.09501, vd is 29.43, and the specific gravity is 7.3.) in Example 5.

Table 13 shows basic lens data of the imaging lens of Example 5. Table 14 shows data regarding specs of the imaging lens of Example 5. Table 15 shows data regarding aspherical surface coefficients of the imaging lens of Example 5.

TABLE 13

Example 5/Lens Data

| Si | Ri | Di | Ndj | vdj |
|---|---|---|---|---|
| 1 | 12.38201 | 1.40000 | 2.09501 | 29.43 |
| 2 | 4.00250 | 2.33421 | | |
| *3 | −1.18274 | 1.10000 | 1.53391 | 55.89 |

TABLE 13-continued

Example 5/Lens Data

| Si | Ri | Di | Ndj | vdj |
|---|---|---|---|---|
| *4 | 8.87371 | 0.44392 | | |
| *5 | 1.71006 | 1.91437 | 1.61399 | 25.53 |
| *6 | −8.44436 | 0.27011 | | |
| 7(Stop) | ∞ | 0.21053 | | |
| *8 | 16.68788 | 0.19999 | 1.61399 | 25.53 |
| *9 | 0.80000 | 1.55693 | 1.53391 | 55.89 |
| *10 | −1.04430 | 1.49999 | | |
| 11 | ∞ | 0.80000 | 1.51680 | 64.20 |
| 12 | ∞ | −0.00627 | | |

TABLE 14

Example 5/Specs(d-line)

| | |
|---|---|
| f | 0.869 |
| Bf | 2.021 |
| FNo. | 2.99 |
| 2ω[°] | 218.6 |

TABLE 15

Example 5/Aspherical Surface Coefficients

| | Surface Numbers | | | | | | |
|---|---|---|---|---|---|---|---|
| | 3 | 4 | 5 | 6 | 8 | 9 | 10 |
| KA | 0.0000000E+00 | 0.0000000E+00 | 0.0000000E+00 | 0.0000000E+00 | 0.0000000E+00 | −3.0000000E+00 | 0.0000000E+00 |
| A3 | 3.4534641E−01 | 7.1537734E−01 | 2.9565950E−01 | −1.8914592E−02 | −1.0410137E−01 | 0.0000000E+00 | 4.6260994E−02 |
| A4 | −9.4256431E−02 | −6.0483474E−01 | −3.6008393E−01 | 2.3676287E−01 | 1.0411452E+00 | 0.0000000E+00 | −6.2502863E−01 |
| A5 | 8.6819352E−03 | 3.4692797E−01 | 3.3704865E−01 | −2.6512781E−01 | −8.2727236E+00 | 0.0000000E+00 | 2.3493276E+00 |
| A6 | −6.8785895E−04 | 4.3801046E−01 | 8.3595226E−02 | −1.5934201E−01 | 2.7489785E+01 | 0.0000000E+00 | −3.8706960E+00 |
| A7 | −3.0320225E−03 | −9.7344294E−02 | −3.7552545E−01 | 5.2267948E−01 | −5.5984261E+01 | 0.0000000E+00 | 1.7999136E+00 |
| A8 | 1.3997695E−03 | −3.3624879E−01 | 2.9032108E−01 | −3.6254028E−01 | 1.0718850E+02 | 0.0000000E+00 | 1.0158698E+00 |
| A9 | 1.1791715E−04 | −7.4042468E−02 | −9.2971026E−02 | 4.3277755E−02 | −3.3200875E+02 | 0.0000000E+00 | 1.0395467E+00 |
| A10 | −4.7343251E−05 | 8.2863141E−02 | 2.9749977E−02 | −4.0353135E−01 | 6.2597143E+02 | 0.0000000E+00 | −1.4433527E+00 |
| A11 | −1.1484796E−05 | 6.3918991E−02 | −2.7366079E−02 | 4.2546647E−01 | 9.1677488E+02 | | −4.7571536E+00 |
| A12 | −2.8412625E−06 | −9.2240119E−03 | 5.8810922E−03 | 8.6962185E−01 | −6.8616890E+03 | | 6.3206669E+00 |
| A13 | −1.4076852E−06 | 1.6975553E−02 | −5.7191110E−03 | −1.3929339E+00 | 1.1255055E+04 | | −1.4441708E+00 |
| A14 | 9.0306447E−07 | −7.6736589E−03 | 4.2487760E−03 | 5.3241791E−01 | −4.2247799E+03 | | −1.2170167E−02 |
| A15 | −4.3390269E−08 | −3.2488441E−03 | 4.7336449E−03 | −4.1520151E−01 | 4.0721123E+03 | | −6.0598453E−01 |
| A16 | 3.4894091E−08 | −7.6466641E−03 | −1.6536810E−03 | 6.5412038E−01 | −2.7866905E+04 | | 4.8259032E−02 |
| A17 | 2.7547647E−09 | 1.5264480E−03 | −1.6072328E−03 | −1.5569955E+00 | 1.4610478E+04 | | −3.6667101E−01 |
| A18 | −4.6321298E−09 | 6.6177572E−04 | 1.5120351E−04 | 2.1716844E+00 | 6.6828336E+04 | | 6.9395872E−01 |
| A19 | −6.6733909E−10 | 1.2667094E−03 | −3.1385977E−04 | 1.4136083E−01 | −1.0071865E+05 | | −2.4074473E−01 |
| A20 | 2.5473741E−10 | −4.5186421E−04 | 3.7474664E−04 | −9.0140145E−01 | 4.2095355E+04 | | −1.7427518E−03 |

Further, Table 16 shows values corresponding to conditional formulas (1) through (8) of Examples 1 through 5. As can be seen from Table 16, the values of each of the Examples are within the numerical ranges of the respective conditional formulas (1) through (7). Note that Examples 1 and 5 are not included within the range of conditional formula (8), and Example 4 is not included within the range of conditional formula (5-1).

TABLE 16

| Expression Number | Conditional Formula | Example 1 | Example 2 | Example 3 | Example 4 | Example 5 |
|---|---|---|---|---|---|---|
| (1) | vd1 + 26*Nd1 | 81.8 | 72.4 | 69.8 | 76.6 | 83.9 |
| (2) | f3/L | 0.243 | 0.213 | 0.198 | 0.205 | 0.218 |
| (3) | d4/L | 0.039 | 0.038 | 0.038 | 0.038 | 0.039 |
| (4) | vd2 | 55.89 | 55.89 | 55.39 | 55.89 | 55.89 |
| (5), (5-1) | vd3 | 25.53 | 25.53 | 25.53 | 30.27 | 25.53 |
| (6) | vda | 55.89 | 55.89 | 55.89 | 55.89 | 55.89 |
| (7) | vdb | 25.53 | 25.53 | 25.53 | 30.27 | 25.53 |
| (8) | vd1 + 35*Nd1 | 98.0 | 88.6 | 86.0 | 92.8 | 102.8 |

[Aberration Performance]

Figure 6:
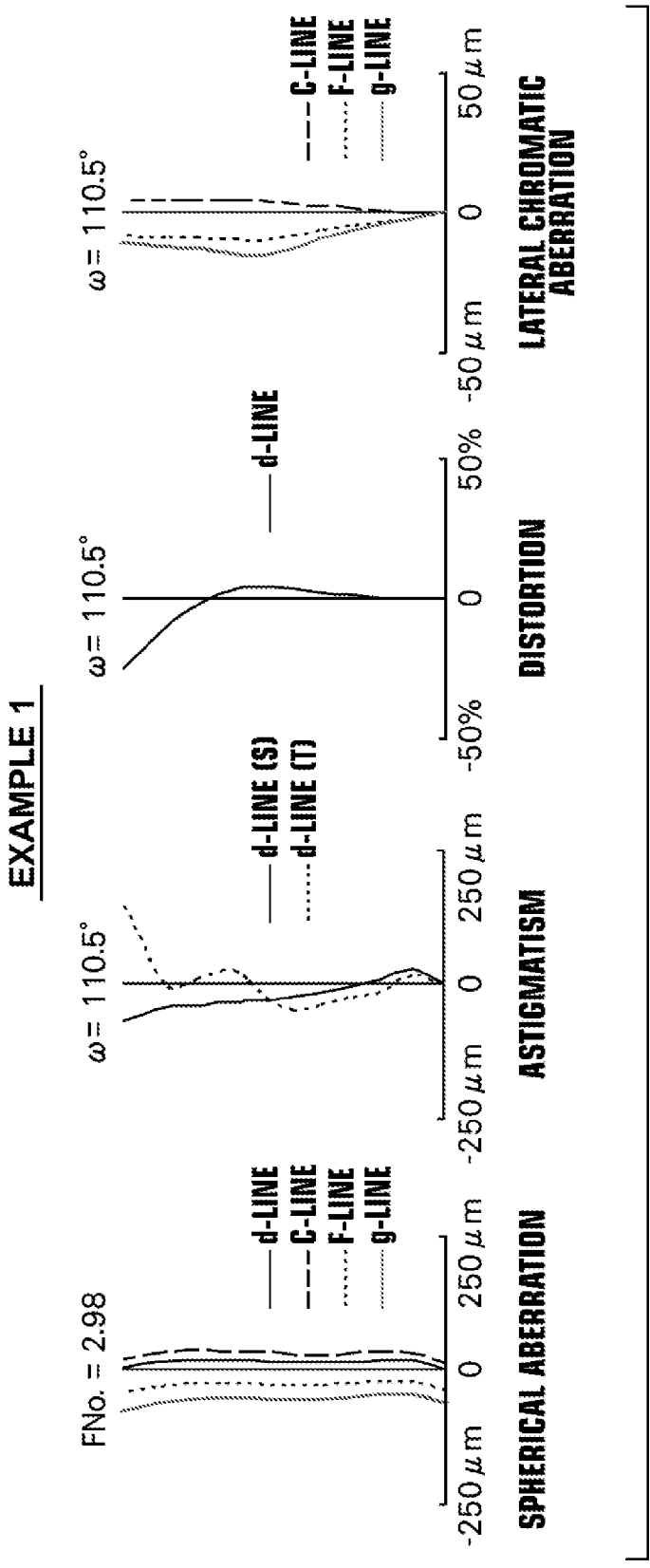
FIG. 6 illustrates the respective aberration diagrams of the imaging lens of Example 1 of the present invention.
Figure 7:
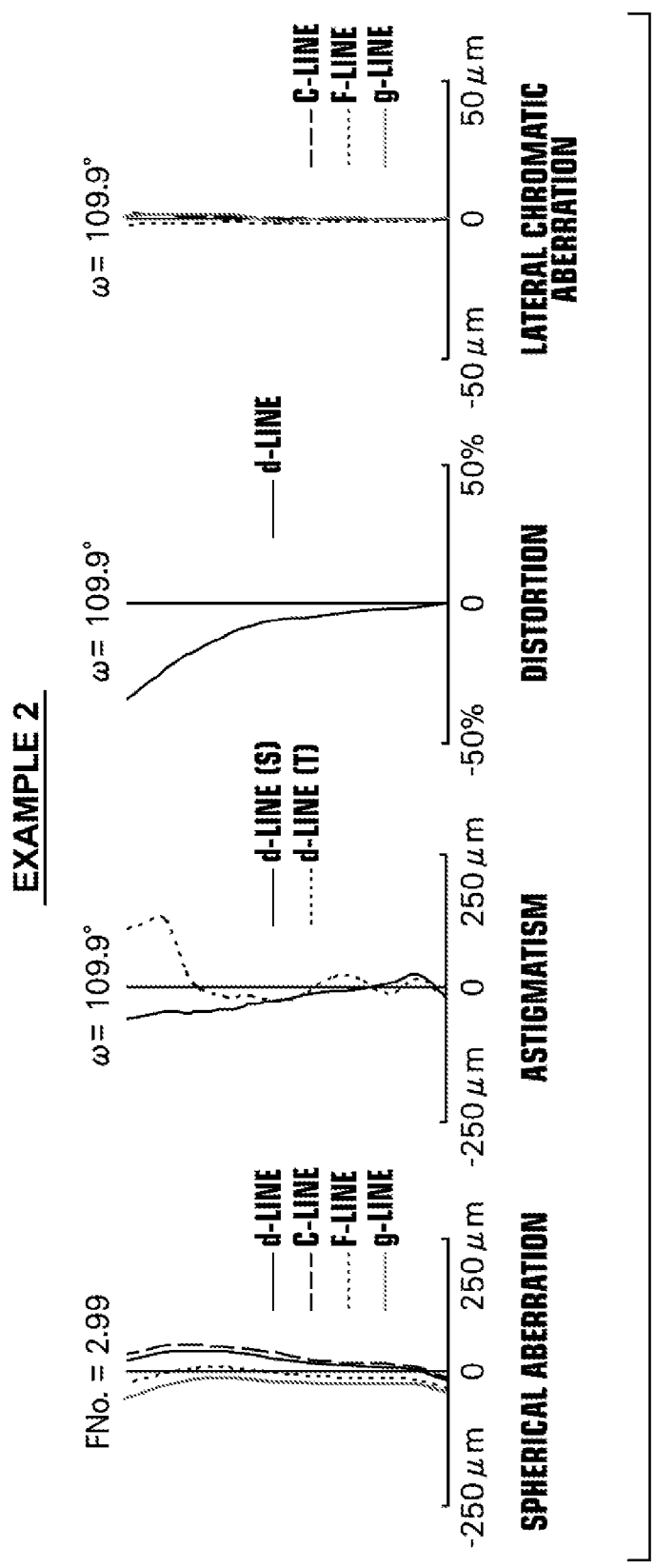
FIG. 7 illustrates the respective aberration diagrams of the imaging lens of Example 2 of the present invention.
Figure 8:
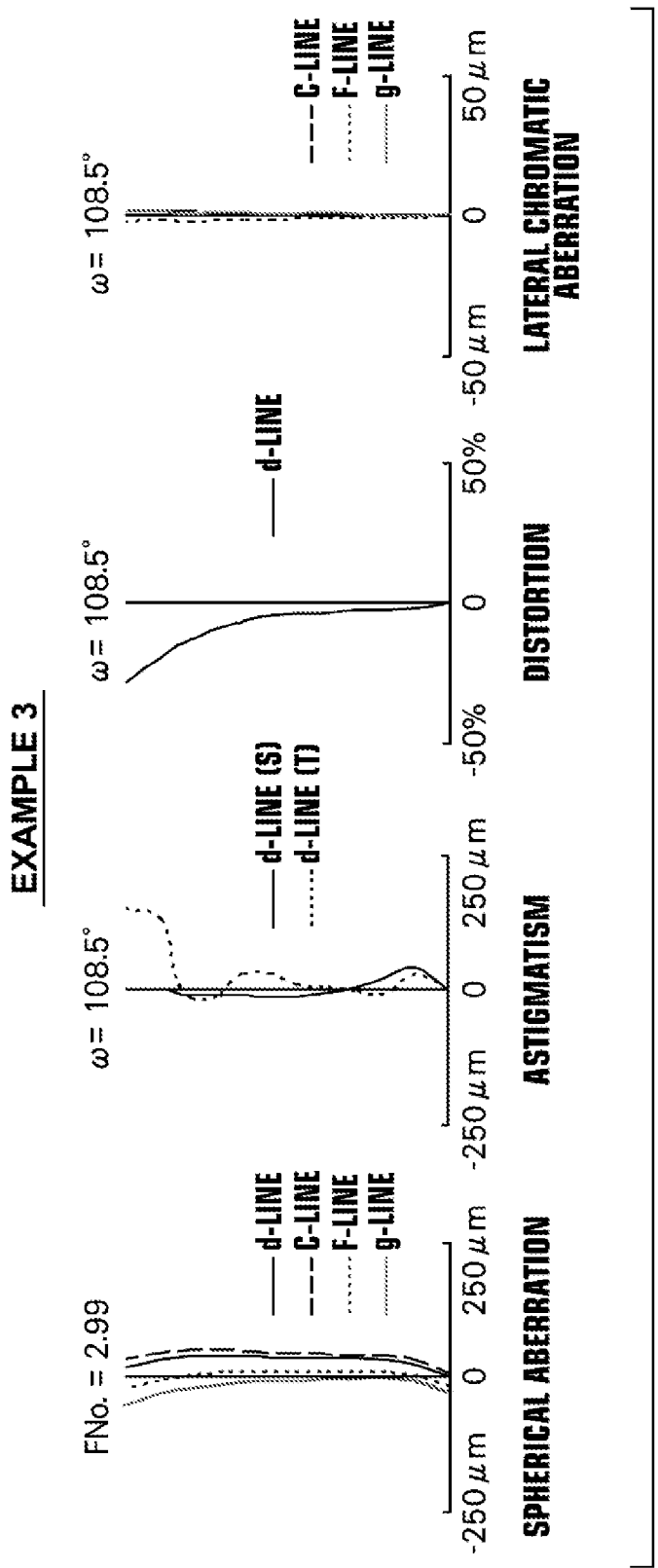
FIG. 8 illustrates the respective aberration diagrams of the imaging lens of Example 3 of the present invention.
Figure 9:
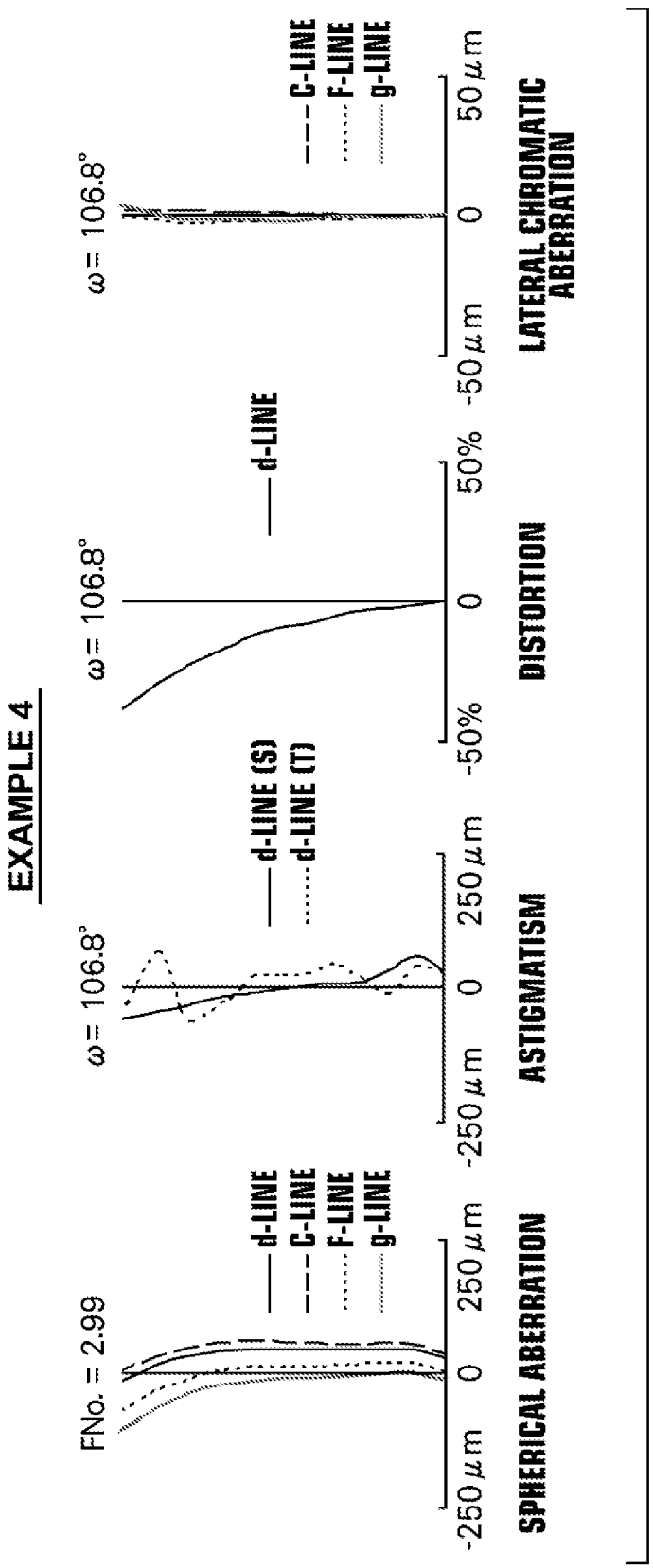
FIG. 9 illustrates the respective aberration diagrams of the imaging lens of Example 4 of the present invention.
Figure 10:
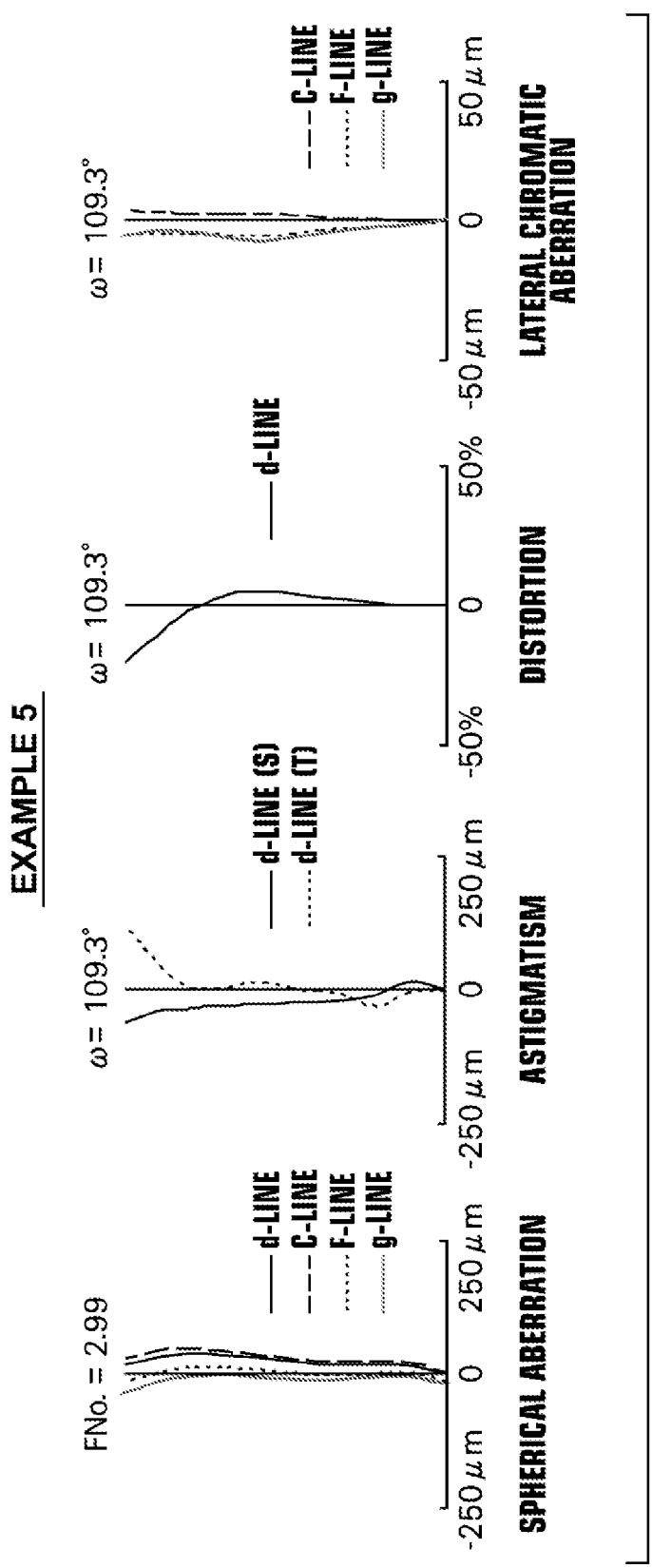
FIG. 10 illustrates the respective aberration diagrams of the imaging lens of Example 5 of the present invention.

FIG. 6 shows spherical aberration, astigmatism, distortion, and lateral chromatic aberration in this order from the left side in the imaging lens according to Example 1. Distortion diagrams show the amount of displacement from an ideal image height which is 2f×tan ($\phi$/2) by using the focal length f of the entire system and an angle of view $\phi$ (which is a variable, $0 \leq \phi \leq \omega$). Each aberration diagram shows aberration with respect to the d-line (wavelength: 587.6 nm) as the reference wavelength. Each spherical aberration diagram shows aberrations with respect to the g-line (wavelength: 436 nm), the F-line (wavelength: 481.6 nm), and the C-line (wavelength: 656.27 nm). Each lateral chromatic aberration diagram also shows aberrations with respect to the g-line, the F-line, and the C-line. FNo. in each of spherical aberrations refers to a F number, $\omega$ in each of the other aberration diagrams refers to a half angle of view.

Similarly, the aberration diagrams of spherical aberration, astigmatism, distortion, and lateral chromatic aberration of each of the imaging lenses of the aforementioned Examples 2 through 5 are shown in FIGS. 7 through 10. FIGS. 7 through 10 also illustrate spherical aberration, astigmatism, distortion, and lateral chromatic aberration in this order from the left side.

The present invention is not limited to the embodiments and the examples described above, and various modifications are possible. For example, values, such as the radius of curvature, the distances between surfaces, the refractive indices, of each lens element, and the like are not limited to the values in the numerical examples shown in the Tables, but may be other values.

As can be found from the data described above, each of the imaging lenses of Examples 1 through 5 achieves low cost by using a relatively cheap material for the first lens L1. Further, the respective imaging lenses have extremely wide full angles of view which exceed 210 degrees, e.g., 213.6 through 221.0 degrees, and have high optical performance with each aberration corrected favorably. These imaging lenses can be suitably used for surveillance cameras, vehicle mounted cameras for photographing images in the front, side, and back of an automobile, and the like.

Figure 11:
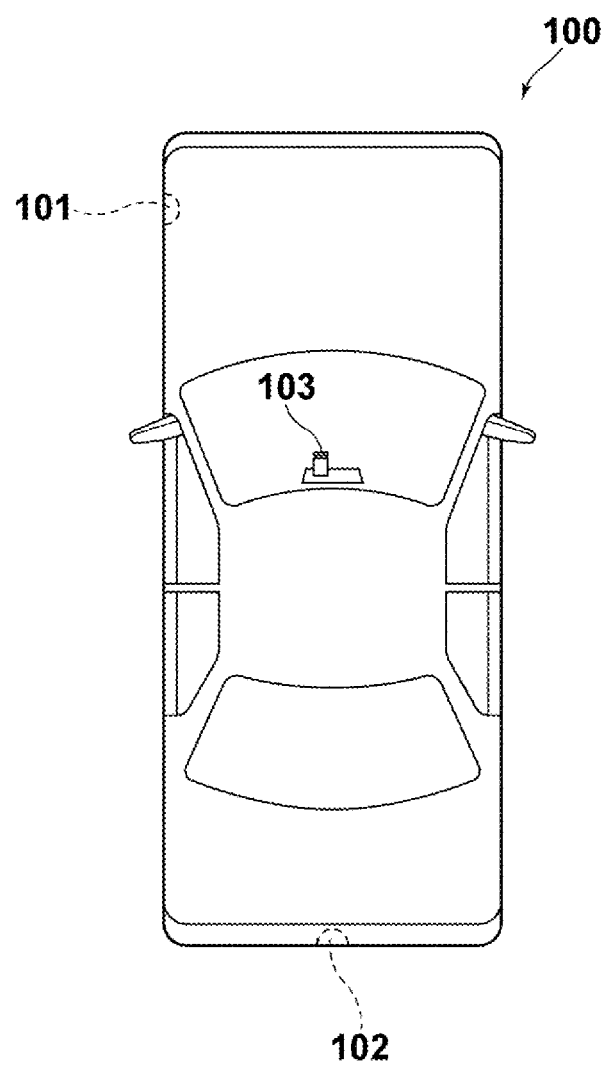
FIG. 11 is a view for explaining an arrangement of a vehicle mounted imaging apparatus according to the embodiment of the present invention.

FIG. 11 shows the aspect of an automobile 100 on which the imaging apparatus provided with the imaging lens of the present embodiment is mounted, as a usage example. In FIG. 11, the automobile 100 is provided with an outside-vehicle camera 101 for photographing a blind angle range on the side surface of the passenger's side thereof, an outside-vehicle camera 102 for photographing a blind angle range behind the automobile 100, and an in-vehicle camera 103, which is provided on the back of a room minor, for photographing the same visual field range as the driver's. The outside-vehicle cameras 101, 102, and the in-vehicle camera 103 correspond to the imaging apparatus according to the embodiment of the present invention, and are provided with the imaging lens according to the present embodiment of the present invention and an imaging element which converts an optical image formed by the imaging lens into an electric signal.

All the imaging lenses according to the Examples of the present invention have the advantageous points described above. Accordingly, the outside-vehicle cameras 101, 102, and the in-vehicle camera 103 can be also configured in a small size and at low costs, have wider angles of view, and enables fine images to be obtained even in the peripheral portions of the imaging area.

The present invention has been described with reference to the Embodiments and Examples. The present invention is not limited to the embodiments and the examples described above, and various modifications are possible. For example, values, such as the radius of curvature, the distances between surfaces, the refractive indices, the Abbe numbers of each lens element, and the like are not limited to the values in the numerical examples shown in the Tables, but may be other values. Further, the materials of lenses are not limited to those applied in the respective numerical examples described above, but may be other materials.

The embodiment of the imaging apparatus was described with reference to the Figure of an example, in which the present invention is applied to a vehicle mounted camera. The present invention is not limited to this application and can be applied to portable terminal cameras, surveillance cameras, and the like, for example.

What is claimed is:

1. An imaging lens consisting of:
  a front group which consists of a negative first lens having a meniscus shape with a convex surface toward the object side, a negative second lens, a point along the optical axis at the image-side surface of which is more toward the object side than points on both ends of the effective diameter of the image-side surface, and a positive third lens;
  an aperture stop; and
  a rear group which is positive as a whole, in this order from the object side, wherein
  the rear group consists of one positive lens and one negative lens; and
  conditional formula (1) below is satisfied:

$$60.0 < vd1 + 26*Nd1 < 85.0 \quad (1),\text{ where}$$

vd1: the Abbe number with respect to the d-line of the material of the first lens, and Nd1: the refractive index with respect to the d-line of the material of the first lens, and conditional formula (2) below is satisfied:

$$0.15 < f3/L < 0.26 \qquad (2),\text{ where}$$

f3: the focal length of the third lens, and

L: the distance from the object-side surface of the first lens to the imaging plane along the optical axis (back focus corresponds to an air converted length).

2. The imaging lens of claim 1, wherein the third lens is of a shape with a convex surface toward the object side.

3. The imaging lens of claim 1 that satisfies conditional formula (3) below:

$$d4/L < 0.07 \qquad (3),\text{ where}$$

d4: the distance between the second lens and the third lens along the optical axis, and L: the distance from the object-side surface of the first lens to the imaging plane along the optical axis (the back focus corresponds to an air converted length).

4. The imaging lens of claim 1 that satisfies conditional formulas (8) below:

$$80.0 < vd1 + 35*Nd1 < 96.0 \qquad (8),\text{ where}$$

vd1: the Abbe number with respect to the d-line of the material of the first lens, and Nd1: the refractive index with respect to the d-line of the material of the first lens.

5. The imaging lens of claim 1, wherein the rear group consists of the negative lens and the positive lens in this order from the object side.

6. The imaging lens of claim 1, wherein the positive lens and the negative lens in the rear group are cemented to each other.

7. The imaging lens of claim 6, wherein a joint surface of the positive lens and the negative lens is of a shape with a convex surface toward the object side in a paraxial region.

8. The imaging lens of claim 6, wherein the joint surface of the positive lens and the negative lens is of an aspherical shape in which a refractive power becomes weaker in portions further away from the optical axis.

9. The imaging lens of claim 1, wherein a specific gravity of the material of the first lens is less than or equal to 4.0.

10. The imaging lens of claim 1 that satisfies conditional formulas (5-1) below:

$$vd3 < 27 \qquad (5\text{-}1),\text{ where}$$

vd3: the Abbe number with respect to the d-line of the material of the third lens.

11. An imaging apparatus comprising:
the imaging lens of claim 1.

12. An imaging lens consisting of:
a front group which consists of a negative first lens having a meniscus shape with a convex surface toward the object side, a negative second lens, a point along the optical axis at the image-side surface of which is more toward the object side than points on both ends of the effective diameter of the image-side surface, and a positive third lens;

an aperture stop; and a rear group which is positive as a whole, in this order from the object side, wherein the rear group consists of one positive lens and one negative lens; and conditional formula (1) below is satisfied:

$$60.0 < vd1 + 26*Nd1 < 85.0 \qquad (1),\text{ where}$$

vd1: the Abbe number with respect to the d-line of the material of the first lens, and Nd1: the refractive index with respect to the d-line of the material of the first lens, and conditional formula (3) below is satisfied:

$$d4/L < 0.07 \qquad (3),\text{ where}$$

d4: the distance between the second lens and the third lens along the optical axis, and L: the distance from the object-side surface of the first lens to the imaging plane along the optical axis (the back focus corresponds to an air converted length).

13. An imaging lens consisting of:
a front group which consists of a negative first lens having a meniscus shape with a convex surface toward the object side, a negative second lens, a point along the optical axis at the image-side surface of which is more toward the object side than points on both ends of the effective diameter of the image-side surface, and a positive third lens;

an aperture stop; and a rear group which is positive as a whole, in this order from the object side, wherein the rear group consists of one positive lens and one negative lens; and conditional formula (1) below is satisfied:

$$60.0 < vd1 + 26*Nd1 < 85.0 \qquad (1),\text{ where}$$

vd1: the Abbe number with respect to the d-line of the material of the first lens, and Nd1: the refractive index with respect to the d-line of the material of the first lens, wherein the rear group consists of the negative lens and the positive lens in this order from the object side.

* * * * *